United States Patent [19]

Yokoyama et al.

[11] Patent Number: 5,037,890

[45] Date of Patent: Aug. 6, 1991

[54] PROCESS FOR PRODUCING GRAFT-MODIFIED ALPHA-OLEFIN COPOLYMER

[75] Inventors: Masuzo Yokoyama; Shinichi Yamauchi; Hiroshi Nakano; Michiharu Kihira; Hiroshi Omori, all of Yokkaichi, Japan

[73] Assignee: Mitsubishi Petrochemical Company Limited, Tokyo, Japan

[21] Appl. No.: 264,433

[22] Filed: Oct. 28, 1988

[30] Foreign Application Priority Data

Nov. 2, 1987 [JP] Japan .................................. 62-277687
Nov. 6, 1987 [JP] Japan .................................. 62-280737

[51] Int. Cl.$^5$ ..................... C08F 255/04; C08F 255/08
[52] U.S. Cl. ...................................... 525/250; 525/268; 525/270; 525/319; 525/320; 525/322; 525/324
[58] Field of Search ............... 525/268, 270, 319, 320, 525/322, 324, 250

[56] References Cited

U.S. PATENT DOCUMENTS 3,435,096  3/1969  Limbert et al. ...................... 525/322

FOREIGN PATENT DOCUMENTS 2656231  6/1977  Fed. Rep. of Germany ...... 525/268

Primary Examiner—John C. Bleutge
Assistant Examiner—Vasu S. Jagannathan
Attorney, Agent, or Firm—Koda and Androlia

[57] ABSTRACT

A copolymer of an α-olefin with an aromatic diolefin such as divinylbenzene produced by means of Ziegler-Natta polymerization and having a vinylphenyl moiety is subjected to polymerization with an ethylenically unsaturated monomer by means of anion polymerization or free radical polymerization, whereby a graft-modified α-olefin copolymer is obtained.

8 Claims, 28 Drawing Sheets

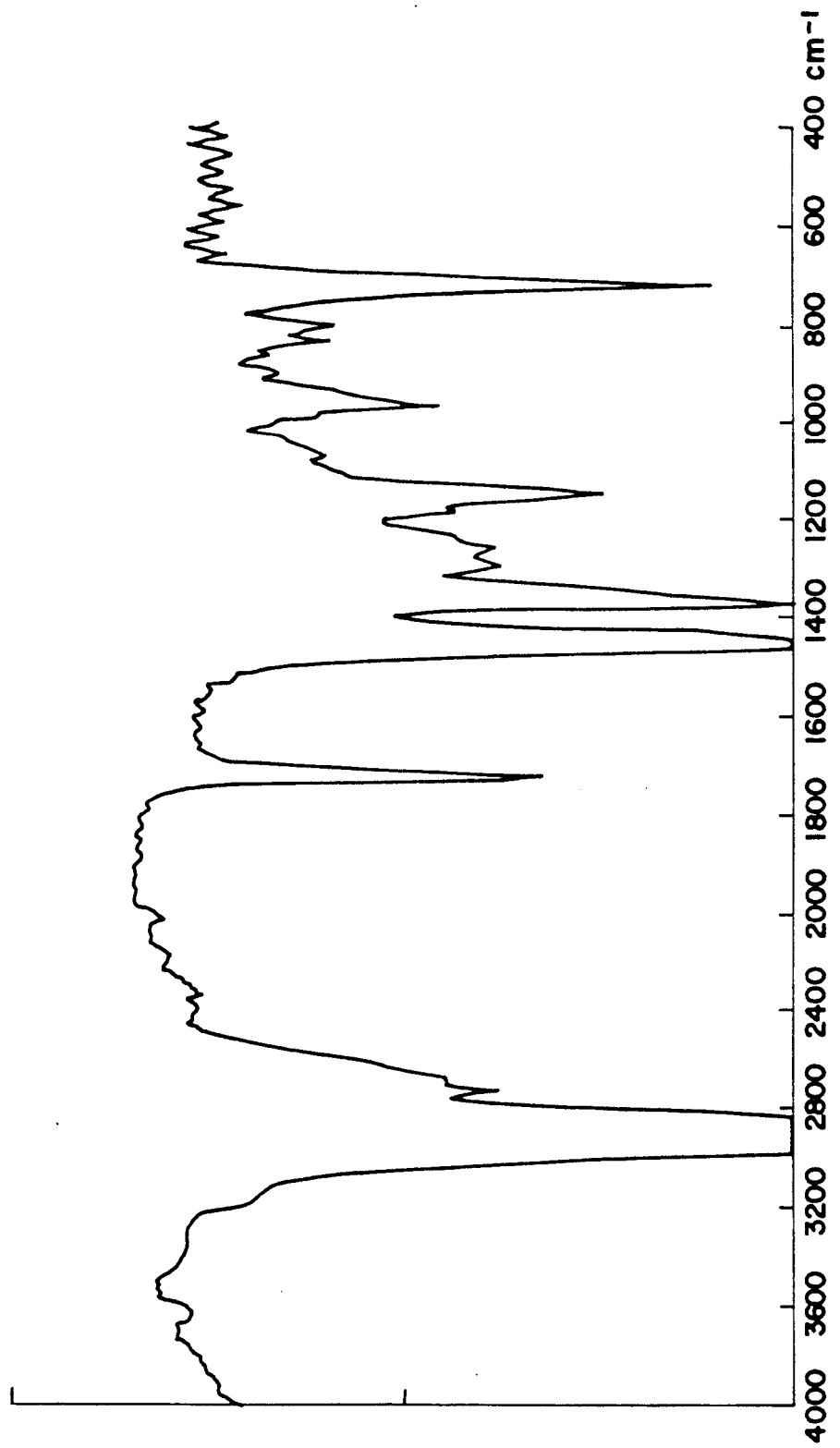
F I G. 25

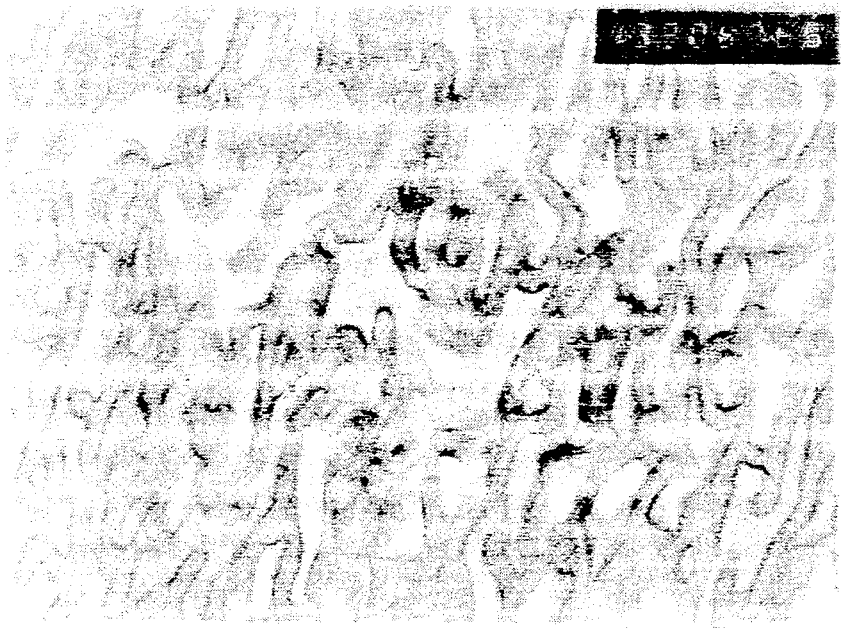
F I G. 28

PROCESS FOR PRODUCING GRAFT-MODIFIED ALPHA-OLEFIN COPOLYMER

BACKGROUND OF THE INVENTION

1. Field of the Art

This invention relates to a process for producing a graft copolymer having the main chain of a copolymer comprising an α-olefin and a dialkenylbenzene and the side chain of a polymer of an anion or radical polymerizable monomer.

2. Prior Art

A polyolefin modified with a polymerizable aromatic hydrocarbon type monomer such as styrene and its derivative is endowed with affinity for aromatic hydrocarbon polymers which has not been inherently possessed by a polyolefin. Accordingly, such modification is utilized for improvement in adhesiveness or compatibility with aromatic hydrocarbon polymers. Also, in some cases, it becomes possible to disperse the modified polyolefin itself into a matrix resin, whereby impact resistance and other characteristics of the matrix resin can be improved.

Also, a polyolefin modified with a polymerizable monomer having a polar group in the molecule such as unsaturated carboxylates and nitriles is endowed with adhesiveness with polar substances, miscibility with other polar resins. Accordingly, a polyolefin thus modified is used for wide uses combined with other substances.

As the method for modification method to obtain such modified polyolefins, there have been done a large number of attempts to modify the polyolefins made by use of Ziegler-Natta type catalysts into random copolymers, block copolymers or graft copolymers by use of vinyl aromatic compounds, conjugated diene compounds, polar group containing polymerizable monomers, etc.

For example, the following production methods have been known.

i) The method in which an α-olefin and another copolymerizable monomer are subjected to random copolymerization by use of one kind of catalyst comprising the Ziegler-Natta type catalyst (the case when the copolymerizable monomer is a nitrogen-containing or oxygen-containing vinyl monomer: J. Polymer Sci., Part C No. 22, 157 (1968), U.S. Pat. No. 3,492,277, Japanese Patent Publication No. 37,756/1973, Japanese Laid-Open Patent Publications No. 116,710/1980, No. 80,413/1984 and No. 80,414/1984, Makromol. Chem. Macromol. Symp., 3, 193 (1986); the case when the copolymerizable monomer is a conjugated diene: J. Polymer Sci., Polym. Chem. Ed., 10, 3027 (1972), Makromol. Chem. 179, 2173 (1978); the case when the copolymerizable monomer is a styrene type monomer: Japanese Laid-Open Patent Publication No. 26011/1985).

These methods are generally inherent in low polymerization activity and the polymer yield may be sometimes extremely poor. Also, it is difficult to control the composition and distribution of the comonomer in the copolymer chain, and therefore a modified polyolefin copolymer controlled in the polymer structure can be obtained with difficulty. Particularly, since it is difficult for the copolymer to include segment which is produced by continuously polymerized comonomer units themselves, these methods are not adequate when it is desired to obtain a modified polyolefin having both the characteristics of the α-olefin polymer and the characteristics of the homopolymer of the comonomer itself.

ii) The method for modifying polyolefin by block copolymerization of an α-olefin with other various polymerizable monomers.

As such modification method, first the following methods have been attempted.

a) A method for producing a block copolymer of an α-olefin and tetrahydrofuran wherein by using a specific vanadium-based Ziegler-Natta type catalyst a living polymer of an α-olefin is produced and then a specific transformative treatment is applied to the active terminal end of the living polyolefin to form a terminal carbocation which is to effect the block copolymerization (Japanese Laid-Open Patent Publications No. 196,317/1984 and No. 252,623/1985). A method for producing a block copolymer of an α-olefin and methyl methacrylate by using the same catalyst and forming a radical group at the active terminal end of the living polyolefin, thereby polymerizing methyl methacrylate. (Makromol. Chem. 186, 11 (1985)). There is also a method for obtaining a block copolymer of an α-olefin and styrene by adding a halogen to the active terminal end of the same living polyolefin and carrying out the coupling reaction between this product and a living polystyryl potassium (C. C. Price ed., "Coordination Polymerization" Plenum Pub., New York (1983), p. 246).

b) Further, as a method similar to the above method, there has been also proposed a method for obtaining a block copolymer of an α-olefin and styrene by adding a halogen to the terminal double bond of a polyolefin obtained by the so-called Kaminsky type Ziegler-Natta type catalyst, and then carrying out the coupling reaction of the product with a living polystyryl lithium (Japanese Laid-Open Patent Publication No. 158,709/1987).

However, according to these methods a) and b), α-olefin is polymerized by use of a specified Ziegler-Natta type catalyst, and therefore the block segment of the polyolefin produced would be specialized in the polymer structure. Accordingly, the block copolymer obtained by these methods would be limited in uses. For example, when propylene is used as α-olefin in the method of a), the structure of the polypropylene chain becomes to have the syndyotactic structure, whereby no block copolymer with polypropylene having useful isotactic structure would be obtained. On the other hand, the polyolefin obtained by the method of b) would have narrow molecular weight distribution, and therefore this method would not be suitable when a polymer with broad molecular weight distribution is required. Further, both of the methods a) and b) must be performed according to a plural number of complicated reaction steps and under special conditions of extremely low temperature, etc., thus involving problems with respect to economy such as catalyst cost, process cost, etc. along with block efficiency.

c) As a method to utilize the active terminal end of a polyolefin, there also exists the method for obtaining a block copolymer by polymerizing an α-olefin by use of a conventional Ziegler-Natta type catalyst, and then polymerizing an acrylate or methacrylate in the presence of specific catalyst species such as an organic phosphorus compound or a tertiary amine and a benzyl halide (Japanese laid-Open Patent Publications No. 38,594/1977, No. 39,786/1977, No. 63,987/1977 and No. 37,791/1978). However, this method would involve the problems such that the polyolefin inactivated may be partially formed in the former stage polymerization and that the comonomer species available in the latter stage polymerization is limited.

d) There has been also attempted a method for obtaining a block copolymer of polyolefin and polystyrene or polybutadiene according to the so-called active site transformation method between the anionic polymerization active site and the Ziegler-Natta type polymerization active site (Japanese Laid-Open Patent Publication No. 20,918/1985, Eur. Polymer J., 17, 1175 (1981), Makromol. Chem., 181, 1815 (1980)). However, these methods have various problems such as lowering in catalyst activity and lowering in block efficiency due to low active site transformation efficiency, and also difficulty in obtaining a copolymer having a desired controlled molecular weight (particularly an anionic polymer chain of high molecular weight), etc.

iii) The method in which other various polymeric monomers are grafting onto a polyolefin obtained by use of the Ziegler-Natta type catalyst.

The method for producing a modified polyolefin by grafting a radical polymerizable monomer onto a polyolefin produced by the Ziegler-Natta type catalyst is a modification method which has been attempted in a large number for many years (Japanese Patent Publication No. 18,118/1971, etc.). For this radical grafting reaction, organic peroxides, $O_3$ (ozone), UV-ray, radiation, etc. are used as the radical generation source. Accordingly, this reaction may sometimes require a special ray source or device, and cannot be a general method in some cases. The method by use of an organic peroxide has no problem with respect to the device as mentioned above, but it involves many problems such as susceptibility of the trunk polymer, i.e. a polyolefin, on which grafting is to be effected to polymer scission, susceptibility to gellation, readiness in formation of homopolymer of the polymerizable monomer to be grafted (lowering in grafting efficiency), difficulty in control of the molecular weight of the graft side chain (these are recognized commonly in the radical grafting methods), whereby a graft-modified polyolefin having desired characteristics can be obtained with difficulty.

As an alternative method for such radical grafting method, there has been also made an attempt to obtain a copolymer having polymer chains of an α-olefin and an anion-polymerizable monomer by combining the Ziegler-Natta type polymerization by use of a Ziegler-Natta type catalyst and the anionic polymerization by use of an anion polymerization initiator (Japanese Patent Publication No. 32,412/1971). However, only by combining simply polymerizations of two different types, because these polymerization active species themselves are different from each other, it would be difficult to form a copolymer with an intervening chemical bond between the polyolefin and the polymer of an anion-polymerizable monomer. That is, the product obtained may be mostly a mixture of the respective homopolymers formed by the two types of polymerizations (see Comparative Example 1 shown below).

An attempt has been also made to improve this problem (Japanese Laid-Open Patent Publications No. 54,712/1987 and No. 54,713/1987). However, according to these methods, the poly-α-olefin formed by the Ziegler-Natta type polymerization is subjected to a complicated specific post-treatment, namely removal of the organic aluminum compound used in the Ziegler-Natta type polymerization by washing with an inert hydrocarbon solvent, and further to the contact treatment between the poly-α-olefin and an organic lithium compound. Further, after unreacted organic lithium compound is removed by washing, finally copolymerization with styrenes or polar group containing vinyl monomers must be carried out, thus involving cumbersome operations.

SUMMARY OF THE INVENTION

An object of the present invention is to give a solution to the above problems, and the object is intended to be accomplished by forming a specific olefin polymer having a specific ethylenically unsaturated bond by the Ziegler-Natta type polymerization and graft polymerizing a side chain polymer thereonto by way of polymerization different from the Ziegler-Natta type polymerization, namely anionic polymerization or radical polymerization.

More specifically, the process for producing a graft-modified α-olefin copolymer according to the present invention, in one aspect, comprises the following steps:

step (a): the step of copolymerizing with the use of a Ziegler-Natta type catalyst an α-olefin having 2 to 20 carbon atoms with a dialkenylbenzene represented by the formula:

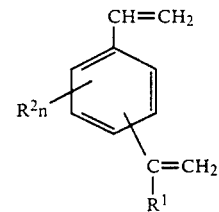

wherein $R^1$ represents a hydrogen atom or a methyl group, $R^2$ represents a hydrocarbyl group having 1 to 6 carbon atoms and n represents 0 or 1;

step (b): the step of graft-polymerizing an anionically polymerizable monomer onto the copolymer obtained in the above step (a) with the use of an anion-polymerization initiator.

The process for producing a graft-modified α-olefin copolymer according to the present invention, in another aspect, comprises the following steps:

STEP 1

The step of producing an olefin copolymer by copolymerizing with the use of a Ziegler-Natta type catalyst an α-olefin having 2 to 20 carbon atoms with a dialkenylbenzene represented by the formula:

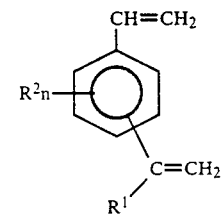

wherein $R^1$ represents a methyl group or a hydrogen atom, $R^2$ represents a hydrocarbyl group having 1 to 6 carbon atoms and n represents 0 or 1;

STEP 2

The step of graft-polymerizing a radically polymerizable monomer onto the olefin copolymer obtained in the step 1 with the use of a free-radical polymerization.

The process for producing the graft-modified α-olefin copolymer may be the same as the prior art technique as described above in that two different types of polymerizations are employed, but by combination of specific types of polymerizations and use of a specific monomer (namely dialkenylbenzene) for introduction of a specific ethylenically unsaturated group to give the grafting site for formation of side chain, a poly-α-olefin modified with a graft of a polymer of an anion-polymerizable monomer (first aspect) or a polymer of a radical-polymerizable monomer (second aspect) can be formed without requiring post-treatments including complicated operations and reactions, with both high grafting ratio and grafting efficiency, and yet without losing the characteristics inherent in the poly-α-olefin used as the trunk polymer.

According to the present invention, various kinds of polymer side chains with broadly variable characteristics can be bonded to the poly-α-olefin, and therefore the modified polymers obtained can be applied widely. Besides, as different from the radical grafting method known in the art in which graft polymerization is directly effected onto a polyolefin, the graft reaction can be practiced without accompaniment of cleavage or crosslinking of the molecular chain of the α-olefin copolymer which becomes the trunk polymer, the desired graft-modified α-olefin copolymer can be designed more easily as different from the prior art technology. Thus, the present invention is a novel method which is also different from the known anion or free radical grafting method and yet has many excellent specific features.

Surprisingly, according to the process of the present invention, particularly that in the first aspect, it is even possible to produce a graft copolymer with approximately 100% of grafting efficiency with the homopolymer of the anion-polymerizable monomer in the step (b) being formed to substantially negligible extent, whereby the removal treatment of unnecessary homopolymer of the anion-polymerizable monomer can be obviated. It has been a great problem in the prior art in both economy and quality to increase grafting efficiency in producing a graft- or block-modified polyolefin copolymer, and the present invention can be said to have provided one method for solving such problem.

Also, according to the process of the present invention, particularly that in the first aspect, the copolymer obtained in the step (a) can be also sometimes subjected as such without any treatment to the grafting reaction in the step (b), and therefore it can be produced industrially advantageously in manufacturing process cost and workability.

The graft-modified α-olefin copolymer obtained in the present invention can be used as the compatibility enhancer in mixtures of polyolefins and various resins, or as the adhesive between polyolefins and various resins. Alternatively, the resin of the present invention as a poly-α-olefin endowed with polarity has a wide application range as a functional material utilizing its characteristics.

According to the process of the present invention, particularly that in the second aspect, the graft-modified olefin copolymer can be controlled to have a gel content of 5% or less (gel content: the copolymer is subjected, after bromine is added to it to saturate the unreacted alkenyl groups not used for the graft reaction, to the Soxhlet's extraction by use of xylene, and the residual amount after extraction is defined as the gel content).

BRIEF DESCRIPTION OF THE DRAWINGS

FIG. 28 is an electron microscope photograph of the MEK extraction insoluble polymer obtained in Example A-1.

DETAILED DESCRIPTION OF THE INVENTION

Figure 1:
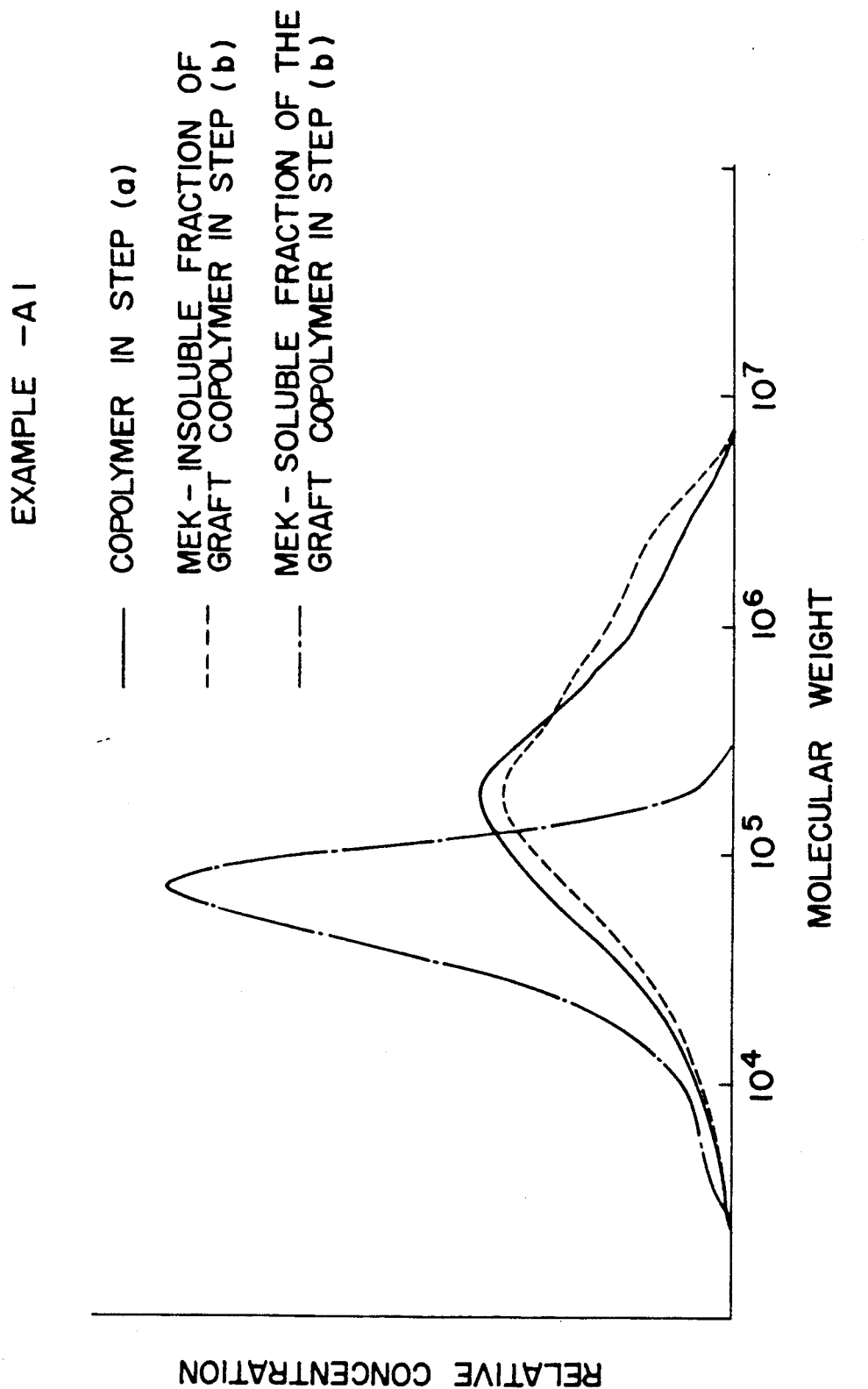
FIGS. 1 and 2 are diagrams showing the GPC data of the copolymers obtained in Examples A-1 and A-9, respectively.

Thus, the process for producing the graft-modified α-olefin copolymer according to the present invention has a primary feature in comprising the steps (a) and (b) and using in the step (a) a specific comonomer, namely a dialkenylbenzene.

Step (a)

(1) Catalyst

The Ziegler-Natta type catalyst to be used in the step (a) of the present invention comprises a combination of a compound (halide, alkoxide, acetylacetonate, etc.) of a metal of the groups IV to VI of the Periodic Table known as its transition metal component and an organometallic compound of a metal of the groups I to III of the Periodic Table known as its organic metal component.

Representative of these transition metal compounds are compounds of titanium, vanadium and zirconium, preferably compounds of titanium. More specifically, for example, in the case of titanium, they are $TiCl_4$, $TiCl_n(OR)_{4-n}$ (n=0 to 4), $TiCl_3 \cdot mAlCl_3$ (m=0 to $\frac{1}{3}$) and the so-called carried type titanium compounds having these compounds carried on magnesium chloride, etc. Also, these transition metal compounds modified with an electron donating compound can be used.

As the organometallic compound of the groups I to III of the Periodic Table, there are organometallic compounds of lithium, sodium, magnesium and aluminum having at least one carbon-metal bond, as represented by the formulae RLi, $R_pMgX_{2-p}$, and $AlR_qX_{3-q}$ (R is an aliphatic, alicyclic or aromatic hydrocarbon residue having up to 20 carbon atoms, X is a halogen atom, p is 1 or 2 and q is 1 to 3).

Examples of such organometallic compounds may include compounds of lithium and compounds of aluminum, specifically ethyllithium, n-propyllithium, isopropyllithium, n-butyllithium, sec-butyllithium, tert-butyllithium, n-decyllithium, phenyllithium, benzyllithium, 1-naphthyllithium, p-tolyllithium, cyclohexyllithium, α-methylstyryllithium, sodium naphthalene, ethylmagnesium chloride, butylmagnesium chloride, dibutylmagnesium, triethylaluminum, triisobutylaluminum, trihexylaluminum, diethylaluminum chloride, diisobutylaluminum chloride, diisobutylaluminum halide, etc. These organometallic compounds can be also combined with an electron donating compound and used in combination with transition metal compounds to form the Ziegler-Natta type catalyst.

The ratio of the amounts of the above organometallic compound and the transition metal compound employed is not particularly limited, but it is generally selected within the range of 0.5 to 500 (molar ratio).

(2) Monomer

In the step (a), an α-olefin and a dialkenylbenzene are copolymerized by use of the Ziegler-Natta type catalyst thus formed. Examples of α-olefin usable here may include straight or branched aliphatic α-olefins having 2 to 20 carbon atoms, preferably 2 to 8 carbon atoms, specifically ethylene, propylene, butene-1, pentene-1, 3-methyl-butene-1, hexene-1, 4-methylpentene-1, 3-ethylbutene-1, heptene-1, 4,4-dimethyl-pentene-1, 3,3-dimethyl-butene-1, and mixtures of these α-olefins.

As the polymerization mode concerning α-olefin, not only homopolymerization mode, but also, when a mixture of α-olefins is used, any of random polymerization modes or block polymerization modes may be employed.

On the other hand, the dialkenylbenzene to be used in the present invention are represented by the structural formula shown below, and may be any of the isomers such as o-, m- and p-isomers, and also a mixture of these isomers. Various derivatives having the benzene ring substituted may be also available.

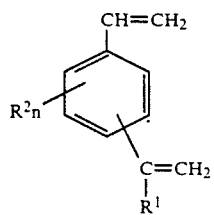

wherein $R^1$ represents a hydrogen atom or a methyl group, $R^2$ represents a hydrocarbyl group having 1 to 6 carbon atoms and n represents 0 or 1.

To show specific examples, divinylbenzene, isopropenylstyrene, divinyltoluene, divinylnaphthalene (namely, $R^2$ is inclusive of a fused benzene ring), etc. can be preferably used. Commercially available crude divinylbenzene contains also ethylvinylbenzene, diethylbenzene, etc., and it can be also used without separating particularly these components.

Copolymerization in the step (a) can be practiced under the conditions similar to those in carrying out conventional Ziegler-Natta type polymerization. For example, in the so-called solvent polymerization where an inert diluent is used, a hydrocarbon solvent such as hexane, heptane, cyclohexane, benzene, toluene, xylene, etc. can be used, and it is commonly practiced at a polymerization temperature ranging from 0° C. to 120° C., preferably from 20° C. to 90° C. The polymerization pressure is also widely variable. As the molecular weight controller of the copolymer, hydrogen can be used.

In the step (a), polymerization is thus carried out under conventional copolymerization conditions. However, what is important in the present invention is that an α-olefin is copolymerized with a dialkenylbenzene. To be further of interest, in that case, it appears likely that one of the two alkenyl groups does not participate in copolymerization with the α-olefin, but remains in the copolymer as a monoalkenylbenzene. Therefore, the copolymer formed in the step (a) can be said to be preferably soluble in a solvent (Determination of solubility: bromine is added to the copolymer for prevention of thermal polymerization of unreacted alkenyl group which may take place, and thereafter the copolymer is subjected to dissolution. solvent: xylene, temperature: 140° C.).

First, as is also apparent from Comparative Example as described hereinafter, from a polyolefin not copolymerized with a dialkenylbenzene, no graft copolymer can be obtained even if an anion polymerizable monomer may be attempted to be graft polymerized by use of an anionic polymerization initiator in the step (b) as described below. Thus, for obtaining a graft copolymer according to the step (b), it is essentially required that the polyolefin should be a copolymer with a dialkenylbenzene.

Also, from the fact that an anion polymerizable monomer can be readily grafted, it may be estimated that the dialkenylbenzene exists as the monoalkenylbenzene in the polyolefin to form the initiation site or the macromer-like polymerization site for the graft polymerization reaction. The detailed reaction mechanism about why only one alkenyl group participates in the reaction during polymerization of a dialkenylbenzene with an α-olefin, while the other alkenyl group remains as such, has not been clarified yet. However, such reaction mode also applies to dialkenylbenzene having a symmetrical structure such as divinylbenzene.

Copolymerization in the step (a) should be desirably carried out so that the dialkenylbenzene compound may be contained in the copolymer in an amount of 0.001 to 10% by weight, preferably 0.05 to 5% by weight. If the content is too high, gellation of the polymer is liable to occur, while on the contrary if it is too low, the graft reaction in the step (b) will not take place especially in the first aspect, anionic polymerization.

The content of the dialkenylbenzene is of course different depending on the kind of the α-olefin to be copolymerized, and the content is generally controlled by the amount of the dialkenylbenzene compound added, the addition rate, the concentration of the α-olefin in the polymerization system, the polymerization temperature and the polymerization time.

Although the state of distribution of the dialkenylbenzene compound in that α-olefin copolymer is not clear, one would properly consider that it is randomly distributed. Also, from the presumption as mentioned above that the anionic polymerization initiation site or the macromer-like polymerization site exists at ths site, as the result of copolymerization with an anion-polymerizable monomer in the step (b), a graft copolymer not a block copolymer may be estimated to be formed. However, there may be also a possibility in the step (a) that a part of the dialkylbenzene compound may be introduced into the terminal end of the poly-α-olefin, and therefore in this case, block copolymers are partially contained. The graft copolymer defined in the present invention is thus a graft copolymer in such meaning, namely including such block copolymers which may happen to be formed.

Step (b)

(1) Catalyst

The copolymer obtained in the step (a) is copolymerized with an anion-polymerizable monomer by use of an anion-polymerization initiator.

As the anion-polymerization initiator, known initiators can be used.

For example, there may be included organometallic compounds having metal-carbon or metal-nitrogen bonds of alkali metals such as lithium, sodium, potassium or alkaline earth metals such as magnesium, calcium, strontium. Particularly, organic lithium compounds are preferred, and specifically various organic lithium compounds as mentioned as examples which can be used for formation of the above Ziegler-Natta type catalyst may be preferably used. Accordingly, in the present invention, in carrying out the copolymerization in the step (a) and the graft copolymerization in the step (b), an organometallic compound of the same kind can be also used.

These anion polymerization initiators can be also used in combination with nitrogen-containing, oxygen-containing basic compounds or alkoxide compounds of alkali metals.

(2) Monomer

As the anion-polymerizable monomer to be grafted, those well known in the art can be used, including, for example, vinyl compounds represented by the formula

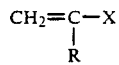

(R is hydrogen, an alkyl having 1 to 8 carbon atoms or chlorine, X is chlorine, phenyl, substituted phenyl, —CH=CHR',

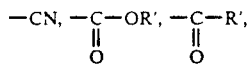

—SiR'$_3$, —Si(OR')'$_3$ (R' is hydrogen, an alkyl having 1 to 8 carbon atoms or phenyl)), more specifically 1,3-dienes, mono- and di-vinyl aromatic compounds, vinyl chloride, vinylidene chloride, acrylonitrile, α-substituted acrylonitrile, acrylate, α-substituted acrylate, acrylamides, vinyl ketones and vinylsilanes.

Further, as other anion polymerizable monomers, there can be used cyclic organosiloxanes represented by the formula:

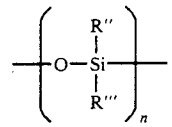

(R", R'" are each an alkyl having 1 to 8 carbon atoms, phenyl and n=3 or 4), alkyl or phenylisocyanates, 1,2-epoxyalkanes, etc.

Specific examples of anion-polymerizable monomers may include styrene, α-methylstyrene, (o,m,p)-methylstyrene, (o,m,p)-chlorostyrene, (m,p)-divinylbenzene, (m,p)-diisopropenylbenzene, (m,p)-vinylisopropenylbenzene, vinylnaphthalene, acenaphthalene, butadiene, isoprene, 2,3-dimethylbutadiene, 1,3-pentadiene, 2-cyanobutadiene, 2-chlorobutadiene, 2-phenylbutadiene, vinyl chloride, vinylidene chloride, acrylonitrile, α-methacrylonitrile, α-ethacrylonitrile, α-octylacrylonitrile, N,N-dimethylacrylamide, N,N-dioctylacrylamide, N-methyl-N-ethylacrylamide, methyl acrylate, ethyl acrylate, butyl acrylate, cyclohexyl acrylate, 2-methylhexyl acrylate, octyl acrylate, methyl methacrylate, methyl ethacrylate, ethyl methacrylate, phenyl methacrylate, 2-vinylpyridine, 4-vinylpyridine, ethyl vinyl ketone, t-butyl vinyl ketone, N-vinylcarbazole, trimethoxyvinylsilane, triethoxyvinylsilane, tri-2-methoxyethoxysilane, triacetoxyvinylsilane, trimethylvinylsilane, tributylvinylsilane, dimethyldivinylsilane, hexamethylcyclotrisiloxane, octamethylcyclotetrasiloxane, hexaphenylcyclotrisiloxane, octaphenylcyclotetrasiloxane, 2,4,6-trimethyl-2,4,6-triphenylcyclotrisiloxane, trimethyltriethylcyclotrisiloxane, tetramethyltetraethylcyclotrisiloxane, trimethyltrivinylcyclotrisiloxane, ethylisocyanate, propylisocyanate, n-butylisocyanate, isobutylisocyanate, amylisocyanate, hexylisocyanate, octadecylisocyanate, phenylisocyanate, benzylisocyanate, allylisocyanate, tolylisocyanate, p-methoxyphenylisocyanate, ethylene oxide, propylene oxide, 1,2-epoxybutadiene, 1,2-epoxyhexane, 1,2-epoxyoctane, 2-phenyl-1,2-epoxyethane, 4-phenyl-1,2-epoxybutane, and so on.

The particularly preferable monomer to be used in the first aspect of the present invention is $C_1$–$C_{10}$ alkyl ester of acrylic acid or methacrylic acid, styrene having or not having lower alkyl substituent on the nucleus and/or in the side chain and vinylsilane.

These anion polymerizable monomers may be used singly or two kinds thereof can be also used as a mixture or successively. Thus, the polymerized graft chain of the anion polymerizable monomer may be any of homopolymer, random and block copolymer chains.

For the polymerization solvent in the step (b), the same solvent as used in the step (a) can be also used. Accordingly, in such case, the copolymerization in the step (a) and the copolymerization in the step (b) can be practiced continuously. Further, although aprotic polar solvents such as tetrahydrofuran, dioxane, ethyl ether, pyridine, etc. may be also used, it is more preferable to use a hydrocarbon solvent.

The polymerization temperature may be selected within the range of −78° C. to 150° C., but it is preferable from the point of workability to carry out the polymerization at a temperature of 0° C. to 130° C. under normal pressure or under pressurization. The reaction time may be 0.1 to 10 hours, preferably 0.3 to 8 hours. Polymerization in the step (b) should preferably be conducted in a system under homogeneous state from the point of graft efficiency, but this is not an essential condition.

In the process of the present invention, the weight composition of the anion-polymerizable polymer in the graft-modified α-olefin copolymer or its molecular weight can be varied depending on the purpose of modification of the poly-α-olefin, and the content of the anion-polymerizable monomer graft polymer is generally made within the range of 5% by weight to 90% by weight. These weight composition and molecular weight can be varied by the content of the dialkenylbenzene compound in the copolymer in the step (a) and the ratio of the anion-polymerizable monomer used to the trunk polymer, and can be also controlled by the ratio of (anion polymerizable monomer/anion polymerization initiator), the polymerization temperature, time, etc. in the step (b).

From the standpoint of prevention of gellation of the graft-modified copolymer according to the present invention, it is preferable to practice the step (b) in the order of adding the catalyst after addition of the anion-polymerizable monomer to the copolymer in the step (a).

To summarize, when practicing the process of the present invention, various characteristics of the graft-modified α-olefin copolymer formed such as grafting ratio, molecular weight, etc. can be controlled suitably by selecting appropriately the kinds and amounts of the monomers, the polymerization pressure, the polymerization temperature, the polymerization time, the kinds and amounts of the catalyst used in the respective polymerization steps, etc.

Step (b')

The first step in the second aspect of the present invention is the same as the step (a) in the first aspect.

The second step in the second aspect of the present invention in which graft copolymerization from the "ethylenically unsaturated" polyolefins obtained in the step (a) according to the radical polymerization mechanism (hereinafter called the step b') is described below.

(1) Subject

Although the product in the first step, the step (a), can be subjected to graft copolymerization in the second step as such, but preferably the copolymer obtained by finishing the copolymerization reaction in the step (a), more preferably the copolymer washed with an inert hydrocarbon solvent, for example, an aliphatic hydrocarbon such as hexane, heptane or the like, an aromatic hydrocarbon such as benzene, toluene, xylene, tetralin or the like, an alicyclic hydrocarbon such as cyclohexane, decalin or the like, is subjected to the step (b').

(2) Monomer

As the radical polymerizable monomer to be used in the step (b'), those well known in the art can be used, but specific examples may include the following monomers: styrene, α-methylstyrene, p-methylstyrene, t-butylstyrene, allylbenzene, butadiene, isoprene, chloroprene, vinyl fluoride, vinyl chloride, vinyl bromide, vinylidene fluoride, vinylidene chloride, vinylidene bromide, tetrafluoroethylene, trifluoroethylene, chlorotrifluoroethylene, dichlorodifluoroethylene, vinyl acetate, vinyl propionate, methyl acrylate, ethyl acrylate, butyl acrylate, octyl acrylate, stearyl acrylate, methyl methacrylate, ethyl methacrylate, butyl methacrylate, octyl methacrylate, stearyl methacrylate, methacrylic acid, itaconic acid, methyleneglutaric acid, itaconic anhydride, methyl vinyl ketone, phenyl vinyl ketone, ethyl vinyl ketone, methyl isopropenyl ketone, methyl vinyl ether, ethyl vinyl ether, phenyl vinyl ether, vinyl thioether, acrylonitrile, acrylamide, acryldimethylamide, dimethylaminoethyl methacrylate, 2-hydroxyethyl acrylate, glycerine methacrylate, glycidyl acrylate, glycidyl methacrylate, allyl acrylate, allyl methacrylate, ethylene glycol diacrylate, divinyl ether, N-vinylpyrrolidone, N-vinylimidazole, ethylmaleimide, N-vinylphthalimide, vinylpyridine, N-vinylcarbazole, N-vinyl-N-methylacetamide, N,N-dimethylaminoethyl acrylate, t-butylacrylamide, methacrylamide, t-butylaminoethyl methacrylate, vinyl sulfide, trimethoxyvinylsilane, triethoxyvinylsilane, γ-methacrylopropyltrimethoxysilane, vinyltrichlorosilane, diphenylmethylvinylsilane and so on.

The particularly preferable monomer to be used in the second aspect of the present invention can be selected from among those exemplified as particularly preferable ones in the first aspect of the present invention.

These radical polymerizable monomers can be used either singly or as a combination of two or more kinds.

(3) Radical polymerization

As the source for generating radicals, also those well known in the art can be used, including heat, radical initiator catalyst, UV-ray, radiation, etc.

The radical initiator catalyst refers to the so-called peroxides such as benzoyl peroxide, tert-butyl peroxide, tert-butyl hydroperoxide, potassium persulfate, etc., azo compounds such as α,α'-azobisisobutyronitrile, etc., redox catalysts such as hydrogen peroxide and a ferrous salt, etc.

These radical generating sources may be selected appropriately in connection with the kinds of the monomer and the polymerization method. Radical polymerization method can be practiced according to bulk polymerization, solution polymerization, suspension polymerization or emulsion polymerization conventionally used.

The temperature for the radical graft polymerization reaction may be in the range generally of 50° to 300° C., preferably of 70° to 200° C., and the polymerization time in the range of 10 minutes to 30 hours, preferably 10 minutes to 10 hours.

The graft polymerization in the step (b') is practiced as described above, and the kind of the radical-polymerizable monomer in the desired graft-modified olefin copolymer, the grafted amount (weight composition), the molecular weight of the graft chain, etc. can be selected suitably depending on the purpose of the desired graft-modified olefin copolymer. For example, to describe about the case when a copolymer of ethylene and divinylbenzene, a copolymer of propylene and divinylbenzene or a copolymer of ethylene, propylene and divinylbenzene is the olefin copolymer obtained in the step (a), the content of the radical polymerizable monomer in the graft-modified olefin copolymer may be preferably made 5 to 90% by weight.

EXPERIMENTAL EXAMPLES

EXAMPLE A1

(1) Copolymerization in step (a)

In a one-liter internal volume stainless steel autoclave equipped with a stirrer and a temperature control unit were introduced after several vacuum-propylene displacements 500 ml of sufficiently dehydrated and deoxygenated n-heptane, 20 ml of divinylbenzene (manufactured by TOKYO KASEI CO., Japan, mixture of m-and p-isomers, divinylbenzene content: 53%), 234 mg of diethylaluminium chloride and 100 mg of titanium trichloride (manufactured by TOYO STAUFFER CO., TTA-12) in this sequence (molar ratio of Al/Ti=3), and 450 ml of hydrogen was charged to initiate copolymerization of propylene and divinylbenzene. Copolymerization was performed under a propylene pressure of 7 kg/cm²G at 65° C. for 3 hours.

After copolymerization was finished, residual monomers were purged off and polymer slurry was filtered to obtain 108.8 g of a powdered copolymer. The catalyst activity for the copolymer was 3,500 g copolymer/g Ti component solid catalyst, the MFR was 5.0 g/10 min, and the stereoregularity by the boiling heptane extraction method was 98.1%.

(2) Graft copolymerization in step (b)

In 300 ml internal volume three-necked flask, 4.0 g of the copolymer obtained in the above described step (a) was introduced and heat-treated in vacuum at 80° C. for 2 hours. Next, to the flask was added 100 ml of purified toluene, followed by 8.8 ml (8.0 g) of a styrene monomer after the temperature was raised up to 110° C. A 4.77 millimole portion of n-butyl lithium (hexane solution) was slowly added dropwise, and the graft copolymerization of styrene was conducted at a temperature of 110° C. for 1 hour. After the copolymerization had been completed, polymerized products were deposited with the use of a large excess of methanol to obtain 11.8 g of a polymer. The conversion of the styrene monomer is 97.5% granting that all amount of the used copolymer portion in the step (a) has been recovered.

(3) Analysis of the polymer (3-1) Copolymer in the step (a)

The content of polymerized divinylbenzene in the copolymer of the step (a) was determined by UV spectrometry and a value of 0.40% by weight was obtained.

The number average molecular weight ($\overline{Mn}$) of the copolymer based on polystyrene by gel permeation chromatography (GPC) was $6.34 \times 10^4$, and the weight average ($\overline{Mw}$) was $41.1 \times 10^4$ (see FIG. 1).

(3-2) Copolymer in the step (b)

In the IR spectrum of the graft copolymer obtained in the step (b), absorption spectra specific to polystyrene were observed in the vicinities of 1600 $cm^{-1}$ and 700 $cm^{-1}$. When the Soxhlet extraction of 3.01 g of the graft copolymer was conducted with methyl ethyl ketone (MEK) as an extraction solvent, 1.90 g of a MEK extraction insoluble polymer was obtained. When the polystyrene content in the MEK extraction insoluble polymer was determined by IR spectrometry, a value of 40.5% by weight was obtained. Accordingly, the graft efficiency which is defined as [weight of the polymer of an anionic polymerizable monomer which is not extracted by an extraction solvent/weight of the total polymers of the anionic polymerizable monomers which have been polymerized in the step (b)]×100 is 39%.

FIG. 1 illustrates the result of the GPC of the MEK extraction insoluble polymer. The number average molecular weight ($\overline{Mn}$) and the weight average molecular weight ($\overline{Mw}$) were $7.37 \times 10^4$ and $54.4 \times 10^4$, respectively.

FIG. 28 is an electron micrograph of the MEK extraction insoluble polymer obtained in Example A1. It can be seen from this electron micrograph that the polymer has a micro phase separation structure.

(4) Evaluation of adhesion

In order to evaluate the adhesion of the polystyrene graft-modified polypropylene of the MEK extraction insoluble products of the polymer obtained in this Example, powder of a graft-modified polypropylene was spread into film between a polypropylene sheet and a polystyrene sheet. These films were subjected to thermocontact bonding and the peel strength of the laminate was measured. Specific test conditions were as follows: Two milliliter of 2.5% (weight/volume) graft-modified polypropylene solution in hot xylene was placed on a 100 mm×100 mm polypropylene sheet (manufactured by MITSUBISHI PETROCHEMICAL CO., LTD., MA-6) having a thickness of 0.8 mm and quickly spread out with a spiral applicator uniformly. After the solution had been dried completely, a 100 mm×100 mm polystyrene sheet (manufactured by MITSUBISHI MONSANTO K.K., HF—77) having a thickness of 2 mm was layered. These sheets were preheated at 220° C. for 3 min and then subjected to thermocontact bonding with a load of 20 kg/cm² for 1 min with the use of a hot press. The laminated sheet thus obtained was cut into a width of 1 cm, and the 180° peel test was performed for these pieces with an Instron tensile strength tester at a traveling speed of 200 mm/min in accordance with JIS-K-6854.

The results obtained are shown in Table 1. It is understood from these results that the denaturated polypropylene obtained in this Example has a satisfactory adhesion.

TABLE A1

| Intermediate bonding layer | Peel strength (kg f/cm) |
|---|---|
| Control (coating with only xylene solvent) | ~0 |
| Polypropylene-graft polystyrene | 7 or more (Polypropylene sheet broken) |

EXAMPLE A2-A4

Polystyrene graft-modified polypropylenes were produced in the same manner and under the same conditions as in Example A1 except that the amount of divinylbenzene introduced in the step (a) in Example A1 was changed. In the Examples, purified xylene was used as the polymerization solvent in the step (b).

The results thus obtained are shown in Table A2.

TABLE A2

| Example | Polymerization in the step (a) | | | | Polymerization in the step (a) | | | Analysis of polymer | | | |
|---|---|---|---|---|---|---|---|---|---|---|---|
| | α-Olefin | Di-vinyl-benzene | Catalyst activity (g polymer/g Ti) | MFR (g/10 min) | Content of copolymerized divinyl-benzene (% by weight) | Anion-polymerizable monomer | Anion-polymerization initiator | Conversion of anionic polymerizable monomer (%) | A* | B* | C* | Graft efficiency (%) |
| A2 | Propylene | 5 ml | 4,630 | 9.5 | 0.13 | Styrene 8.8 ml | n-BuLi 4.77 mmole | 96.0 | 86.2 | 65.8 | 25.0 | 16 |
| A3 | " | 15 ml | 3,580 | 4.0 | 0.35 | Styrene 8.8 ml | n-BuLi 4.77 mmole | 98.5 | 86.0 | 66.3 | 28.4 | 21 |
| A4 | " | 30 ml | 2,780 | 2.1 | 0.62 | Styrene 8.8 ml | n-BuLi 4.77 mmole | 99.0 | 85.2 | 66.4 | 39.5 | 39 |

A*: Stereoregularity of the polymer obtained in the step (a) · (IR spectrometry, $A_{990 cm^{-1}}/A_{970 cm^{-1}}$).
B*: Content of the polymerized anion-polymerizable monomer (styrene) in total polymerized product (% by weight).
C*: Content of the polymerized anion-polymerizable monomer (styrene) in solvent (MEK) extraction insoluble portion (% by weight).

EXAMPLE A5–A8

Polystyrene graft-modified polypropylenes were produced with the copolymer obtained in the step (a) of Example A1 with variously changing the graft conditions of styrene. All of the conditions in the step (b) except those specified in Table A3 were the same as in Example A1.

The results obtained are shown in Table A3.

TABLE A3

| Example | Polymerization in the step (b) | | | | | | Analysis of polymer | | |
|---|---|---|---|---|---|---|---|---|---|
| | Copolymer in the step (a) (g) | Styrene (ml) | n-BuLi (mmole) | Polymerization solvent | Amount of resulting polymer (g) | Conversion of styrene (%) | Content of MEK extraction insoluble product (% by weight) | Content of polystyrene in insoluble product (% by weight) | Graft efficiency (%) |
| A5 | 2.0 | 4.4 | 4.77 | Toluene, 200 ml | 5.4 | 85.0 | 39.9 | 13.2 | 8.4 |
| A6 | 4.0 | 8.8 | " | Toluene, 200 ml | 11.6 | 95.0 | 41.4 | 21.0 | 13 |
| A7 | " | 4.4 | " | 100 ml | 7.82 | 95.5 | 65.4 | 23.0 | 31 |
| A8 | " | " | 2.39 | Xylene, 100 ml | 7.60 | 90.0 | 61.0 | 18.0 | 23 |

EXAMPLE A9

(1) Copolymerization in step (a)

In a one-liter internal volume stainless steel autoclave equipped with a stirrer and a temperature control unit were introduced after several vacuum-propylene displacements 500 ml of sufficiently dehydrated and deoxygenated n-heptane, 2 ml of divinylbenzene (as used in Example 1), 1.93 mmole of n-butyl lithium and 0.987 mmole of titanium tetrachloride (molar ratio of Li/Ti=2) in this sequence to form a Ziegler-Natta type catalyst. After 1500 ml of hydrogen was charged, a mixed gas of ethylene and propylene was continuously fed at feed rates and ratios of 13 g/hr and 33 g/hr, respectively, to initiate copolymerization of ethylene, propylene and divinylbenzene. Copolymerization was performed at a temperature of 25° C. for 2 hours.

(2) Graft copolymerization in step (b)

After the copolymerization in the step (a) described above, the gas of the vapor phase in the autoclave was purged and 20 ml of styrene and 3.85 mmole of n-butyl lithium were added without delay and the temperature was raised up from 25° C. to 80° C. to perform graft copolymerization for 3 hours.

After graft copolymerization the total content of the autoclave was subjected to steam stripping to obtain 33.1 g of the aimed polystyrene graft-modified EPR.

(3) Analysis of the polymer

When the composition of the polystyrene graft-modified EPR obtained above was analyzed by IR spectrometry, the polystyrene content was 63.3% by weight, the weight ratio of ethylene/propylene was 60.0/40.0 and the styrene conversion was ca. 100%.

Figure 2:
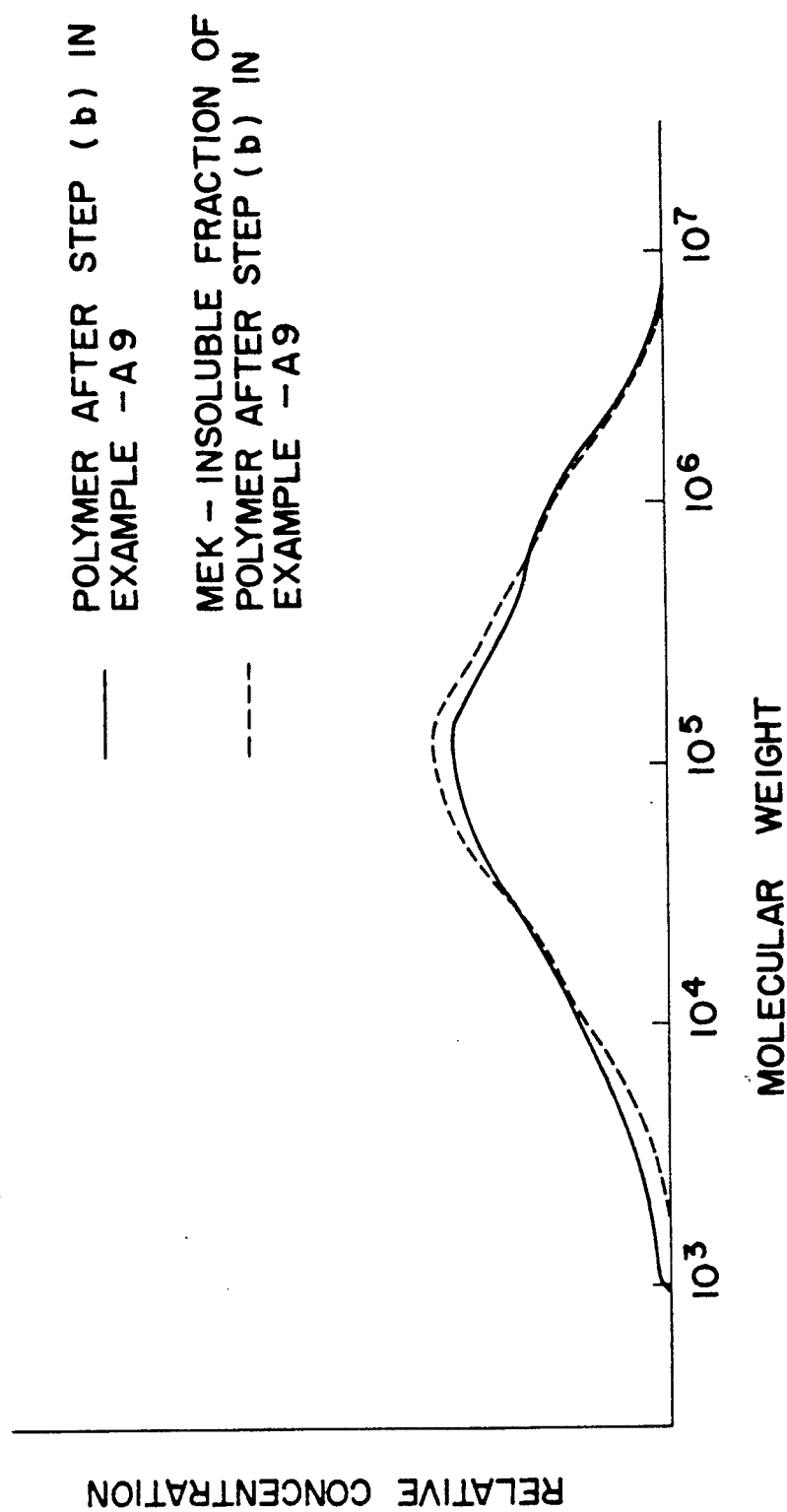

The GPC data of the polymer are shown in FIG. 2. The number average molecular weight ($\overline{Mn}$) and the weight average molecular weight ($\overline{Mw}$) based on polypropylene were $2.58 \times 10^4$ and $33.5 \times 10^4$, respectively, with the molecular weight distribution being very wide.

When the Soxhlet extraction of 3.11 g of the polymer was conducted with a MEK solvent for 5 hours, 3.05 g of a MEK extraction insoluble polymer was obtained. The styrene content in the MEK insoluble polymer was 62.4% by weight.

Accordingly, the polystyrene graft efficiency as defined above was 96.7%.

The GPC data of the MEK insoluble polymer are shown in FIG. 2. The number average molecular weight ($\overline{Mn}$) and the weight average molecular weight ($\overline{Mw}$) were $3.41 \times 10^4$ and $30.2 \times 10^4$, respectively.

EXAMPLE A10 and A11

Polymerization in the step (a) was performed in the same conditions and methods as in Example A9 except that the amount of divinylbenzene used was changed in each case.

After the polymerization in the step (a), 20 ml of styrene and 7.73 mmole of n-BuLi were immediately added to the same autoclave, and the styrene graft polymerization in the step (b) was conducted under the same condition as in Example 9. Table A4 shows the results of the graft polymerization and of the analysis of the polymer.

TABLE A4

| Example | Polymerization in the step (a) Ziegler-Natta catalyst (mmole) | type | α-Olefin (g/hr) | Divinyl-benzene (ml) | Polymerization in the step (a) Anion-polymer-izable monomer | Anion-polymeri-zation initiator | Total polymer (g) | Conver-sion of styrene | Analysis of polymer A* | B* | C* | Graft efficiency (%) |
|---|---|---|---|---|---|---|---|---|---|---|---|---|
| A10 | TiCl$_4$, 0.987 | n-BuLi 1.93 | Ethylene/ propylene, 13/33 | 0.5 | Styrene, 20 ml | n-BuLi 7.73 mmole | 35.7 | 100 | 63/37 | 52.8 | 41.5 | 71 |
| A11 | TiCl$_4$, 0.987 | n-BuLi 1.93 | Ethylene/ propylene, 13/33 | 1.0 | Styrene, 20 ml | n-BuLi 7.73 mmole | 38.6 | 100 | 66/34 | 52.0 | 49.6 | 93 |

A*: Composition of α-olefin copolymer (weight ratio of ethylene/propylene content).
B*: Content of the polymerized anion-polymerizable monomer (styrene) in total polymerized product (% by weight).
C*: Content of the polymerized anion-polymerizable monomer (styrene) in solvent (MEK) extraction insoluble portion (% by weight)

EXAMPLE A12 AND A13

Polystyrene graft-modified EPRs were prepared in the same conditions and methods as in Example A9 except that the amount of n-BuLi used in the step (b) was changed in each case. The results are shown in Table A5 together with those of Examples A9 and A11 for comparison.

In Example A12, although any anionic polymerization initiator was not added in the step (b), a portion of the n-BuLi used for the formation of the Ziegler-Natta type catalyst in the step (a) presumably still remained and served as an anionic polymerization initiator to form the graft polystyrene.

EXAMPLE A14

Polymerization in the steps (a) and (b) was performed in the same conditions and methods as in Example A10 except that the temperature of polystyrene graft polymerization in the step (b) was set at 50° C. The result is shown in Table A5.

atmosphere of nitrogen gas, and the temperature was raised up from 25° C. to 80° C. to perform the polymerization of styrene. After the polymerization of the styrene was finished, the total content of the autoclave was subjected steam stripping to obtain 41.7 g of a polymer.

(2) Analysis of the polymer

When the composition of the polymer thus obtained was analyzed by IR spectrometry, the polystyrene content was 41.7% by weight, the weight ratio of ethylene/propylene was 68/32 and the styrene conversion was 96%.

Figure 3:
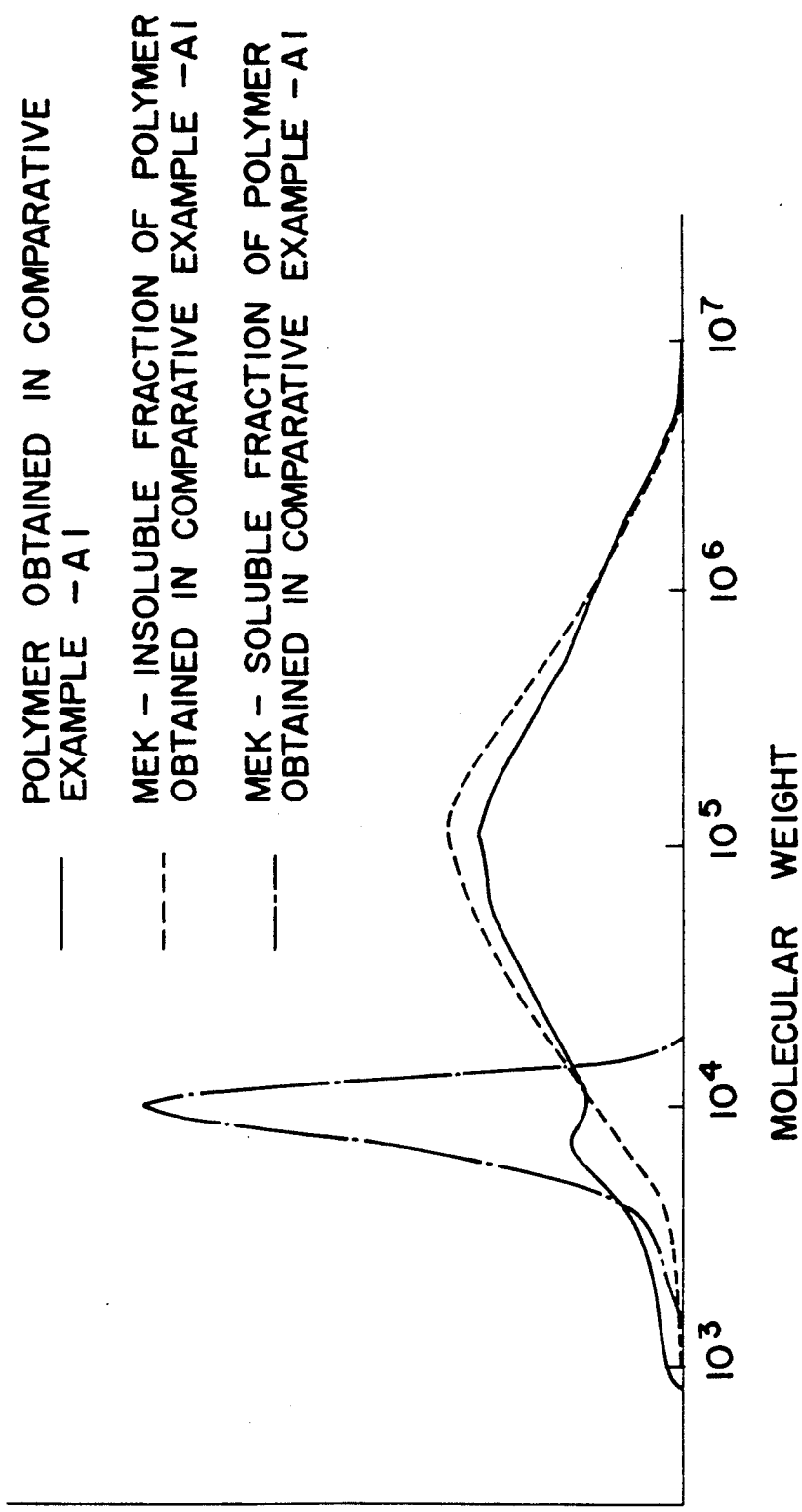
FIG. 3 is the diagram of the GPC data of the copolymer obtained in Comparative Example A-1 and FIG. 4 that of the GPC data of the copolymer obtained in Reference Example A-1.

The GPC data of the polymer are shown in FIG. 3. The number average molecular weight ($\overline{Mn}$) and the weight average molecular weight ($\overline{Mw}$) based on polypropylene were $1.92 \times 10^4$ and $31.0 \times 10^4$, respectively.

When the Soxhlet extraction of 3.04 g of the polymer was conducted with a MEK solvent for 5 hours, 1.97 g of a MEK extraction insoluble polymer was obtained. When the MEK insoluble polymer was analyzed by IR spectrometry, only a very weak absorption specific to

TABLE A5

| Example | Polymerization in the step (a) Ziegler-Natta catalyst (mmole) | type | α-Olefin (g/hr) | Divinyl-benzene (ml) | Polymerization in the step (a) Anion-polymer-izable monomer | Anion-polymeri-zation initiator | Total polymer (g) | Conver-sion of styrene | A* | B* | C* | Graft efficiency (%) |
|---|---|---|---|---|---|---|---|---|---|---|---|---|
| A12 | TiCl$_4$, 0.987 | n-BuLi 1.93 | Ethylene/ propylene, 13/33 | 2.0 | Styrene, 10 ml | 0 | 28.5 | 8 | 74/26 | 4.9 | 4.7 | 93 |
| A13 | TiCl$_4$, 0.987 | n-BuLi 1.93 | Ethylene/ propylene, 13/33 | " | 20 ml | n-BuLi 1.92 mmole | 27.8 | 65 | 71/29 | 18.9 | 15.3 | 77 |
| A9 | TiCl$_4$, 0.987 | n-BuLi 1.93 | Ethylene/ propylene, 13/33 | " | " | 3.85 | 33.1 | 100 | 60/40 | 63.3 | 62.4 | 97 |
| A11 | TiCl$_4$, 0.987 | n-BuLi 1.93 | Ethylene/ propylene, 13/33 | 1.0 | " | 7.73 | 38.6 | 100 | 66/34 | 52.0 | 49.6 | 93 |
| A14 | TiCl$_4$, 0.987 | n-BuLi 1.93 | Ethylene/ propylene, 13/33 | 0.5 | " | " | 37.3 | 100 | 61/39 | 49.3 | 24.6 | 40 |

COMPARATIVE EXAMPLE A1

(1) Polymerization

The copolymerization of ethylene/propylene in the step (a) of Example A9 was repeated without divinylbenzene. The copolymerization conditions were completely the same as in the step (a) of Example A9 except that divinylbenzene was not employed.

After the copolymerization was completed, the gas of the vapor phase in the autoclave was purged, 20 ml of styrene and 7.73 mmole of n-BuLi were added in the polystyrene was observed in the vicinity of 1600 cm$^{-1}$. The styrene content in the MEK insoluble polymer was a little less than 2% calculably, although the absorption was too low to be determined. The calculation of the polystyrene graft efficiency with this value gives ca. 3%, which value is extremely low in comparison with the corresponding values in Examples, and thus it is believed that graft polystyrene was not substantially produced in the polymerization.

The GPC data of the MEK extraction insoluble polymer and the soluble polymer are shown in FIG. 3. These patterns are apparently different from the GPC pattern in Example A9 and more likely to a blend of an EPR and polystyrene.

REFERENTIAL EXAMPLE A1-A5

In the procedures used in Examples A9–A14, the extent of copolymerization of the divinylbenzene with an α-olefin remains ambiguous. The test was conducted as follows for the purpose of the degree. After the copolymerization was performed completely in the same conditions and methods except that the amount of divinylbenzene was changed into the predetermined amount in each case, the content of the autoclave was poured into an excess amount of methanol to deposit a polymer. The content of the divinylbenzene polymerized and other properties of the polymer thus obtained were determined. The results are shown in Table A6.

Figure 4:
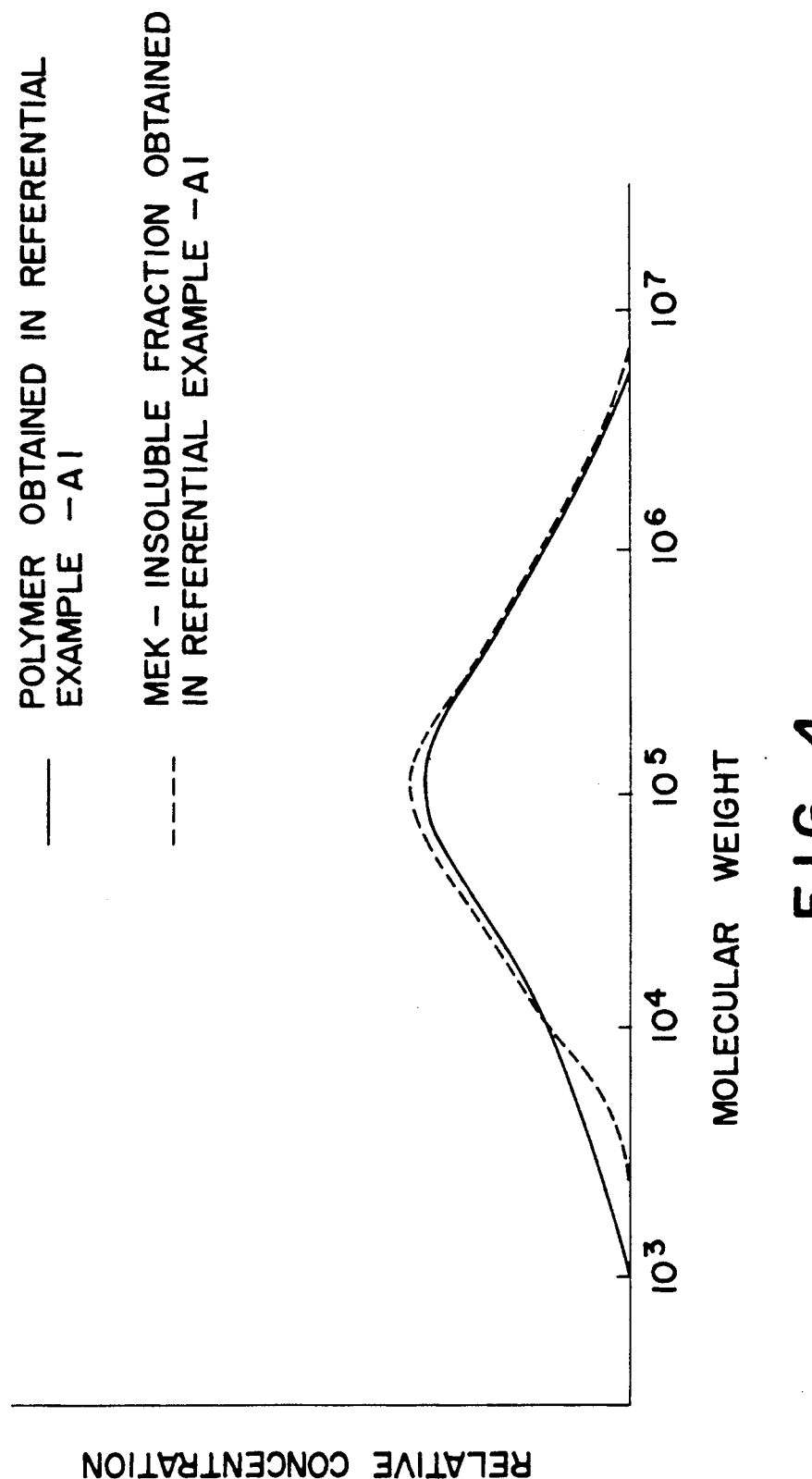

FIG. 4 illustrates the GPC data of the copolymer obtained in Referential Example A1.

stream at 80° C. for 3 hours. Then, 1 liter of purified decalin was added. The mixture was dissolved by heating at 110° C. for 1 hour, and 80 g of a styrene monomer was added to the mixture. A 4.8 mmole portion of n-butyl lithium was slowly added dropwise to the mixture to perform the graft copolymerization of styrene at 110° C. for 3 hours.

After the graft copolymerization was completed, the total content of the flask was poured into methanol to deposit a polymer. The drying treatment under reduced pressure gave 122.5 g of a polymerized product. The conversion of the styrene monomer was substantially 100%.

(3) Analysis of the polymer

When the composition of the graft copolymer obtained in the precedent step (b) was analyzed by IR spectrometry, the polystyrene content was 68.0% by weight, The Soxhlet extraction of 10.31 g of the graft copolymer was conducted for 5 hours with a MEK solvent, 4.53 g of a MEK extraction insoluble polymer

TABLE A6

| | Polymerization in the step (a) | | | | Analysis of polymer | | | |
|---|---|---|---|---|---|---|---|---|
| Example | Ziegler-Natta catalyst (mmole) | type | α-Olefin (g/hr) | Divinylbenzene (ml) | Resulting polymer (g) | Content of polymerized divinylbenzene (% by weight) | Weight ratio of ethylene/propylene composition | Crystallinity of polypropylene[1] |
| Referential Example A1 | TiCl$_4$, 0.987 | n-BuLi 1.93 | Ethylene/propylene, 13/33 | 0 | 31.7 | 0 | 71/29 | 14 |
| Referential Example A2 | TiCl$_4$, 0.987 | n-BuLi 1.93 | Ethylene/propylene, 13/33 | 0.5 | 31.0 | 0.18 | 75/25 | 10 |
| Referential Example A3 | TiCl$_4$, 0.987 | n-BuLi 1.93 | Ethylene/propylene, 13/33 | 1.0 | 28.4 | 0.21 | 76/24 | 8 |
| Referential Example A4 | TiCl$_4$, 0.987 | n-BuLi 1.93 | Ethylene/propylene, 13/33 | 2.0 | 28.6 | 0.24 | 80/20 | =0 |
| Referential Example A5 | TiCl$_4$, 0.987 | n-BuLi 1.93 | Ethylene/propylene, 13/33 | 4.0 | 22.0 | 0.32 | 90/10 | 0 |

[1]Crystallinity of the polypropylene portion in EPR by IR spectrometry ($A_{990 cm^{-1}}/A_{970 cm^{-1}}$).

EXAMPLE A15

(1) Copolymerization in the step (a)

Copolymerization of ethylene/propylene/divinylbenzene was conducted in the same conditions and methods as is Example A9 except that 4.49 mmole of triethylaluminium and 2.26 mmole of titanium tetrachloride (molar ratio of Al/Ti=2) were used as a catalyst, and 10 ml of divinylbenzene and 1,500 ml of hydrogen were used with a copolymerization time of 5 hours. After the copolymerization was finished, the gas of the vapor phase in the autoclave was purged, and the content of the autoclave was poured into a large excessive amount of methanol to deposit a polymer. The polymer was dried under reduced pressure to give 42.2 g of an ethylene/propylene/divinylbenzene copolymer.

The MFR of the copolymer was 2.9 g/min, the weight ratio of ethylene/propylene was 89/11 and the content of the divinylbenzene polymerized was 0.45% by weight.

(2) Graft copolymerization in the step (b)

To a 2-liter internal volume four-necked flask which had been displaced with nitrogen gas, 40 g of the copolymer obtained in the precedent step (a) was added and subjected to drying treatment under nitrogen gas was obtained. When the MEK extraction insoluble polymer was analyzed by IR spectrometry, the polystyrene content was 45.1% by weight.

Accordingly, the graft efficiency as defined above is 29%. The molecular weight and the molecular weight distribution of the polystyrene present as a graft chain are not clarified yet. When the GPC of the MEK extraction soluble polymer was performed for the purpose of speculating them, the number average molecular weight ($\overline{Mn}$) and the weight average molecular weight ($\overline{Mw}$) were $8.3 \times 10^4$ and $24.4 \times 10^4$, respectively. The GPC spectrum exhibited a bimodal peak, which is presumably caused by the addition method of n-BuLi.

EXAMPLE A16

(1) Copolymerization in the step (a)

In a one-liter internal volume stainless steel autoclave equipped with a stirrer and a temperature control unit were introduced after several vacuum-ethylene displacements 500 ml of sufficiently dehydrated and deoxygenated n-heptane, 10 ml of divinylbenzene, 1.49 mmole of triethylaluminium and 0.364 mmole of titanium trichloride (manufactured by TOHO TITANIUM CO., TAC grade) in this sequence, and 5,000 ml of hydrogen was charged to initiate copolymerization of ethylene and divinylbenzene. Copolymerization was performed under a ethylene pressure of 8 kg/cm²G at 85° C. for 5 hours.

After copolymerization was finished, residual monomers were purged off and polymer slurry was filtered to obtain 41.4 g of a powdered copolymer. The MFR of the copolymer was 3.3 g/10 min, and the content of divinylbenzene polymerized was 0.58% by weight.

(2) Graft copolymerization in the step (b)

In 300 ml internal volume four-necked flask which had been displaced with nitrogen gas, 20 g of the ethylene/divinylbenzene copolymer obtained in the above described step (a) was introduced and subjected to drying treatment under nitrogen gas stream at 80° C. for 3 hours. Next, 700 ml of purified decalin was added to the flask was added and the copolymer was dissolved by heating at 110° C. for 1 hour. Then, 40 g of a styrene monomer was added, and 2.4 mmole of n-butyl lithium was added dropwise over a period of 10 minutes, and the graft copolymerization of styrene was conducted at a temperature of 110° C. for 3 hours.

After the copolymerization had been completed, the total content of the flask was poured into methanol to deposit the polymerized product, which was subjected to drying treatment under reduced pressure to obtain 61.9 g of a polymer. The conversion of the styrene monomer is substantially 100%.

(3) Analysis of the polymer

The content of polystyrene in the graft copolymer obtained in the precedent step (b) was determined by IR spectrometry and a value of 68.3% by weight was obtained. The Soxhlet extraction of a 9.89 g portion of the graft copolymer with the use of a MEK solvent for 5 hours gave 6.67 g of a MEK extraction insoluble polymer. The IR spectrometric determination of the polystyrene content in the MEK extraction insoluble polymer gave 56.2% by weight.

Accordingly, the graft efficiency as defined above is 56%. When the GPC of the MEK extraction soluble polymer was performed for the purpose of speculating the molecular weight and the molecular weight distribution, the number average molecular weight ($\overline{Mn}$) of $4.8 \times 10^4$ and the weight average molecular weight ($\overline{Mw}$) of $10.0 \times 10^4$ were obtained.

EXAMPLE A17

(1) Copolymerization in the step (a)

Using as a transition metal component of a Ziegler-Natta type catalyst a titanium catalyst supported on magnesium chloride in an amount of 1 mg based on a titanium atom (supported titanium content, 3.85% by weight) which was prepared in accordance with the method described in U.S. Pat. No. 4,563,436, 500 mg of triethylaluminium as an organic metal component, and 69.4 mg of t-butoxylmethyldimethoxysilane as an electron donor additive respectively (molar ratio of Si-/Al=0.1), copolymerization of divinylbenzene and propylene was conducted with 50 ml of divinylbenzene (the same as used in Example 1) and 800 ml of hydrogen under the condition of a propylene pressure of 7 kg/cm²G at 75° C. for 3 hours according to the process used in Example A1. As a result, 160.9 g of a copolymer product was obtained. The catalyst activity of the copolymer was 6,200 g copolymer/g supported Ti solid catalyst, the MFR was 1.5 g/10 min, and the stereoregularity by the boiling heptane extraction was 98.7%.

The polymerized divinylbenzene content in the copolymer product was 0.90% by weight.

(2) Graft copolymerization in the step (b)

Graft copolymerization was conducted under the same condition and method as in the step (b) of Example A1 except that 4.0 g of the powder copolymer and 100 ml of purified xylene as a graft polymerization solvent of styrene were used. A styrene graft-modified polypropylene was obtained in the yield of 11.9 g. The conversion of styrene was 99%.

(3) Analysis of the polymer

MEK Soxhlet extraction for 3.03 g of the graft copolymer for 5 hours gave 1.89 g of a MEK extraction insoluble polymer. The polystyrene content in the MEK extraction insoluble polymer was 47.5% by weight. Accordingly, the graft efficiency is 44.6%.

EXAMPLE A18–A23

The modified poly-α-olefins with various kinds of grafting polymer of an anionically polymerizable monomer were prepared in the same methods and conditions as those in Example A9 except that the kinds of α-olefins and the amounts of divinylbenzene in the step (a) and the amounts of the anionic polymerizable monomers and n-BuLi and the graft polymerization temperature in the step (b) were changed as specified in Table 7. The results are listed in Table A7.

The IR spectra of these polymer products are illustrated in FIGS. 5–10.

As for Example A18, it is extraordinarily confirmed in consideration of the so-called "ceiling temperature" of the anion-polymerization of α-methylstyrene to be generally at room temperature or less that such a large amount of the polymerized product is present in the resulting polymer as can be seen from the IR spectrum. It is believed to suggest the complexity and delicateness of the chemical reaction which is intrinsically present in the production process of the present invention.

TABLE A7

Figure 5:
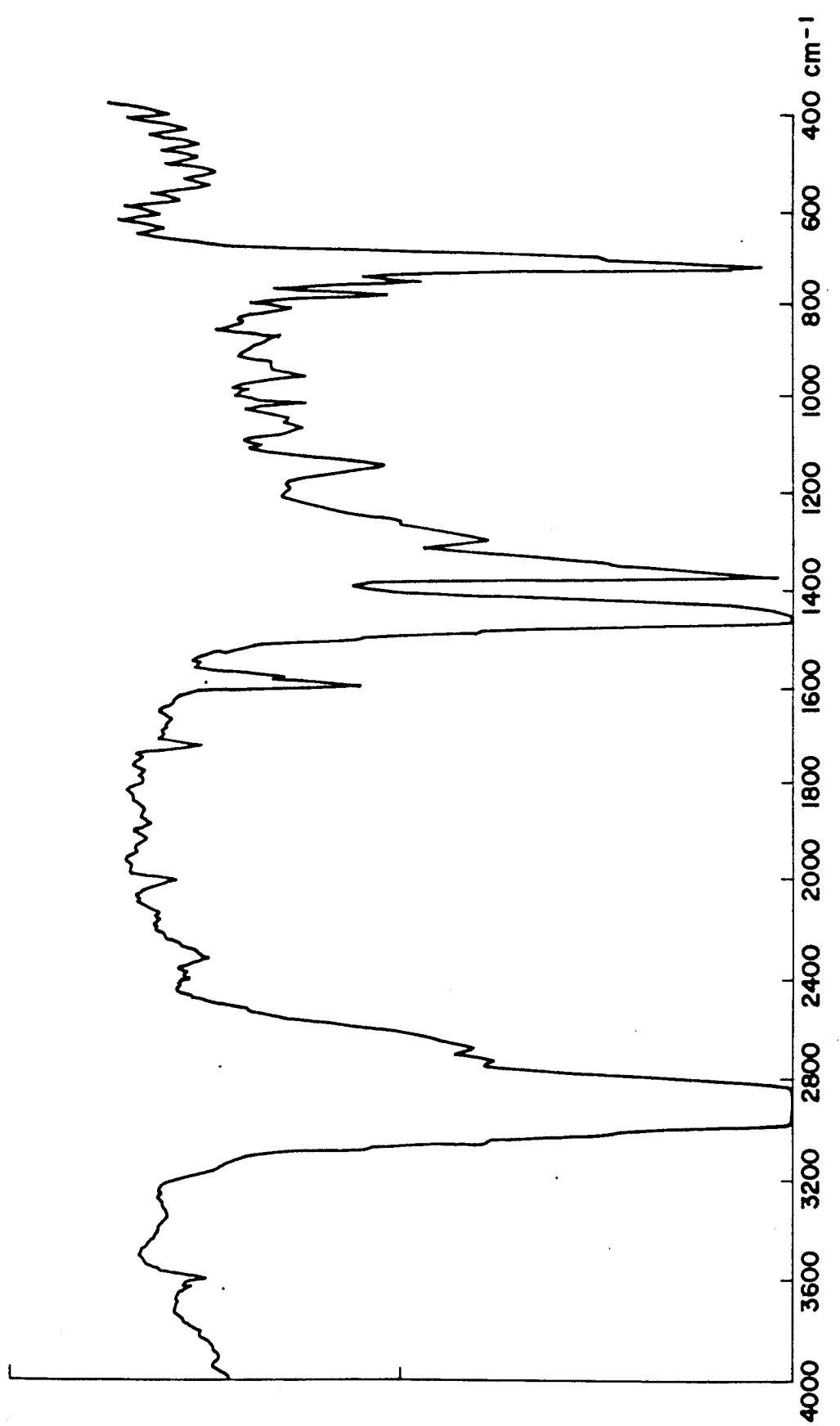
FIGS. 5 through 10 are diagrams showing IR spectra of the copolymers obtained in Examples A-18 to A-23, respectively.
Figure 6:
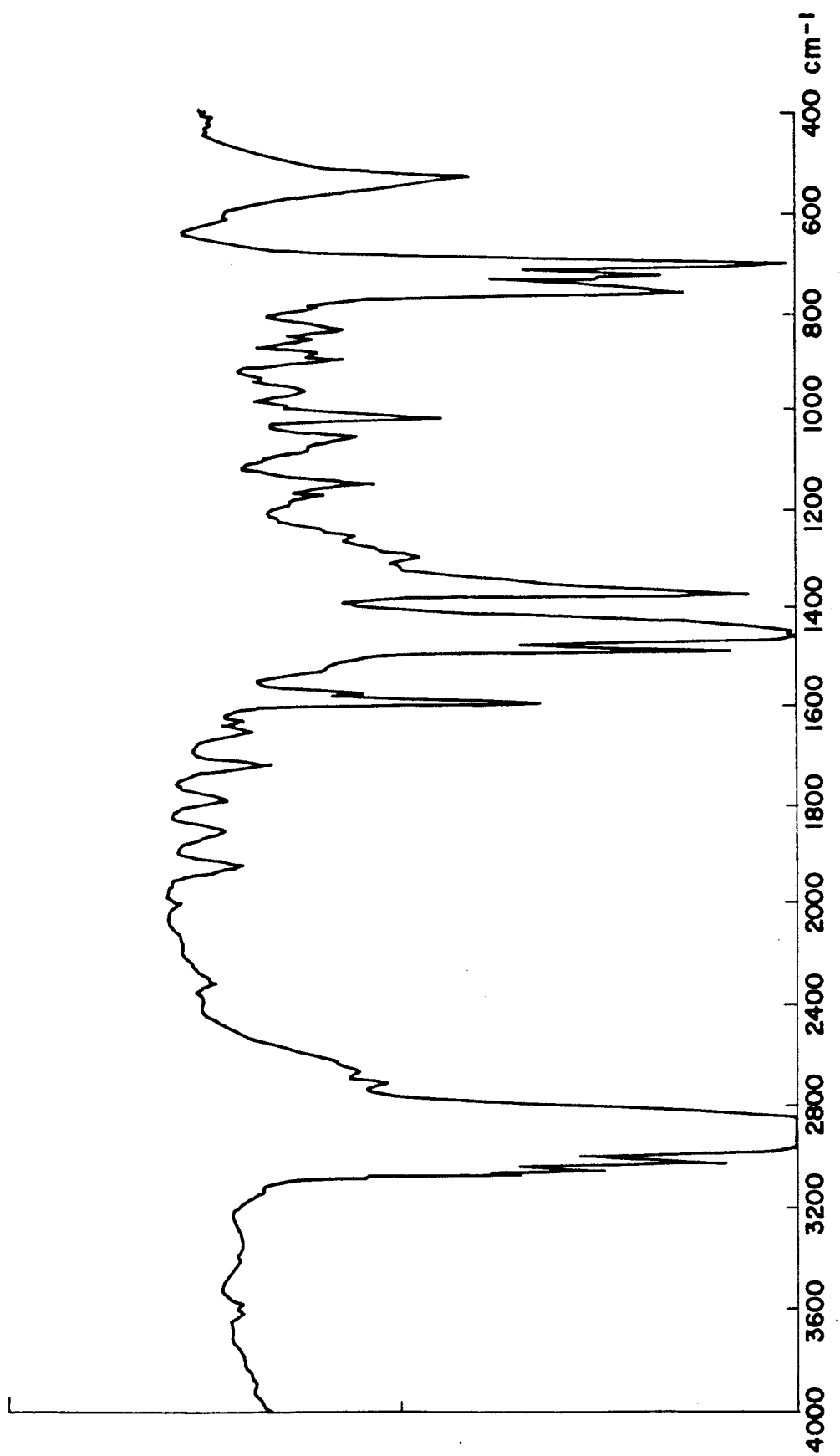

| | Polymerization in the step (a) | | | | Polymerization in the step (a) | | | | |
|---|---|---|---|---|---|---|---|---|---|
| Example | Ziegler-Natta catalyst (mmole) | type | α-Olefin (g/hr) | Divinyl-benzene (ml) | Anion-polymerizable monomer | Anion-polymerization initiator | Temperature/time of anionic polymerization (°C./hr) | Amount of resulting polymer (g) | IR spectrum |
| A18 | TiCl₄, 0.987 | n-BuLi 1.93 | Ethylene/ propylene, 13/33 | 2.0 | α-Methyl-styrene, 40 ml | n-BuLi, 7.73 mmole | 50/3 | 26.4 | FIG. 5*ᵇ |
| A19 | TiCl₄, 0.987 | n-BuLi 1.93 | Ethylene/ propylene, 13/33 | " | Styrene, 20 ml + Isoprene, 10 ml | n-BuLi, 7.73 mmole | 80/3 | 53.3 | FIG. 6*ᵇ |

TABLE A7-continued

Figure 7:
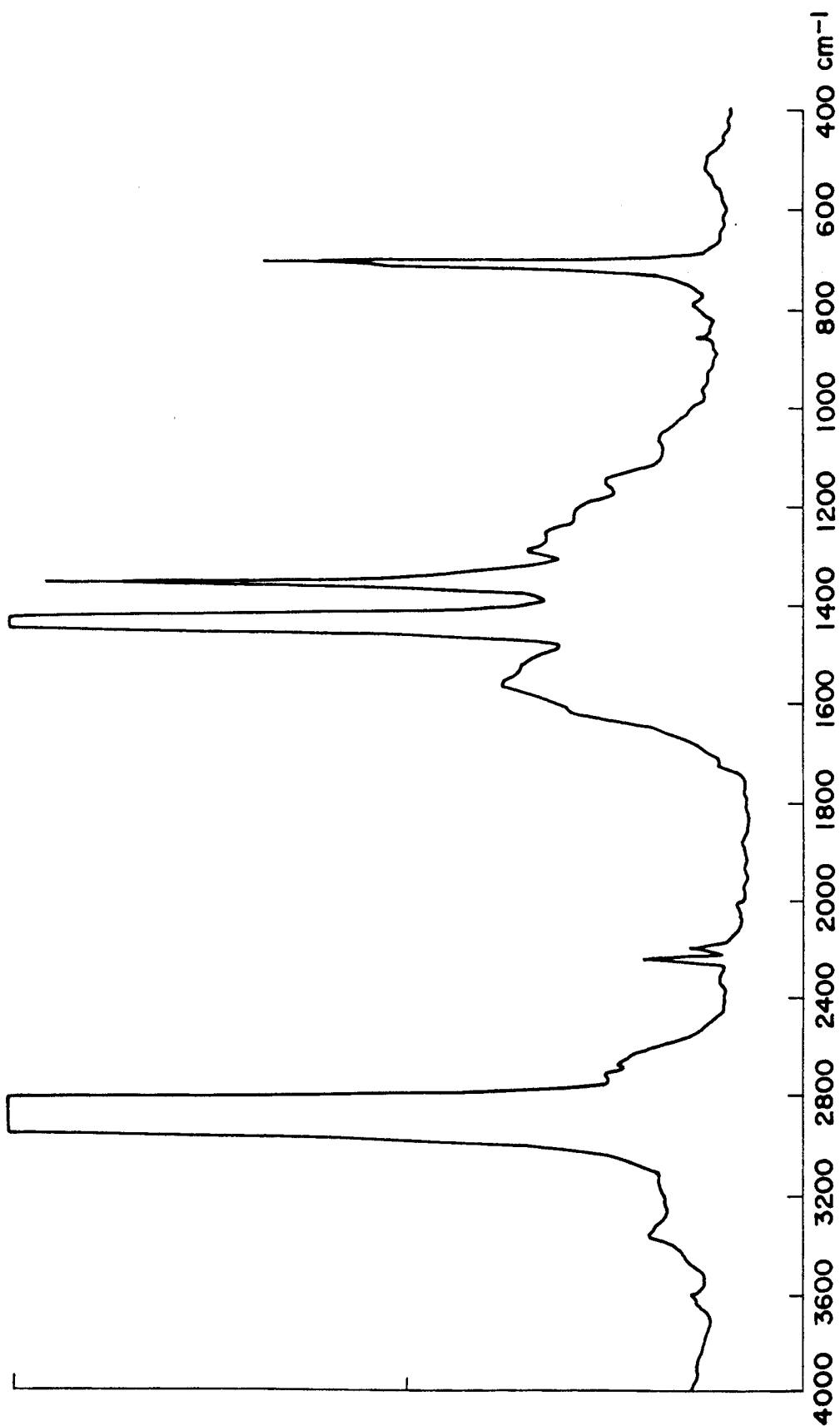
Figure 8:
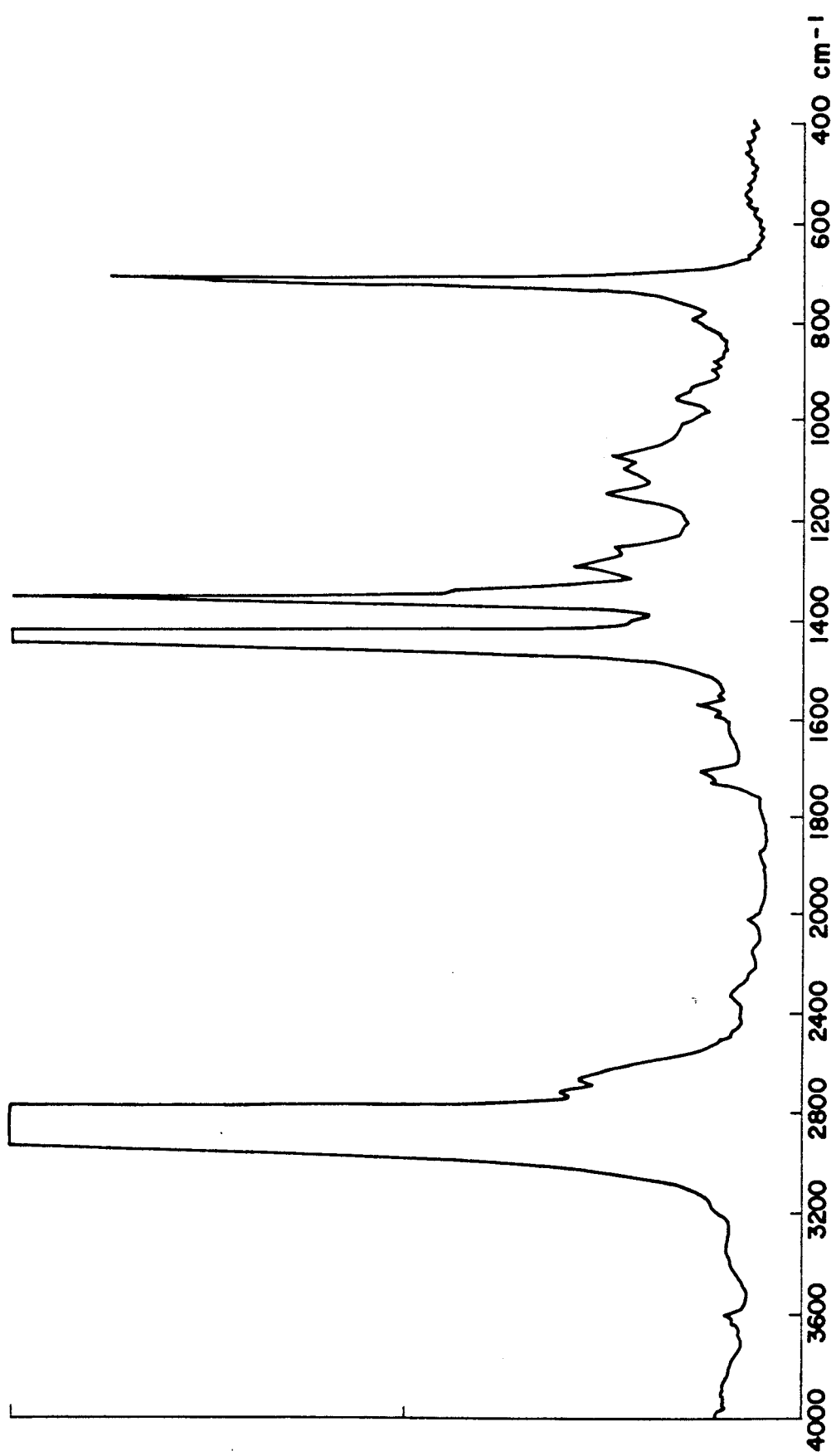
Figure 9:
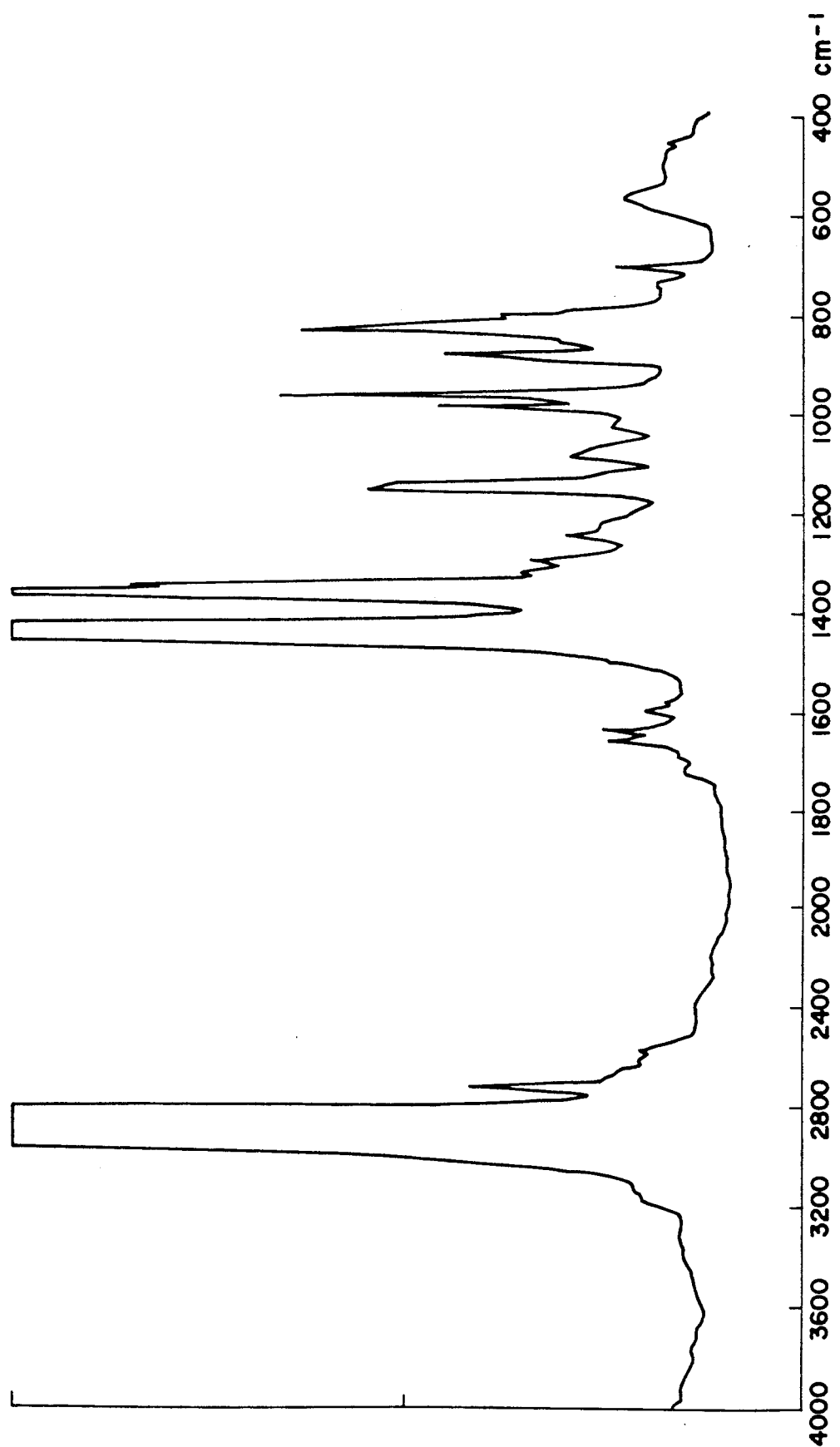
Figure 10:
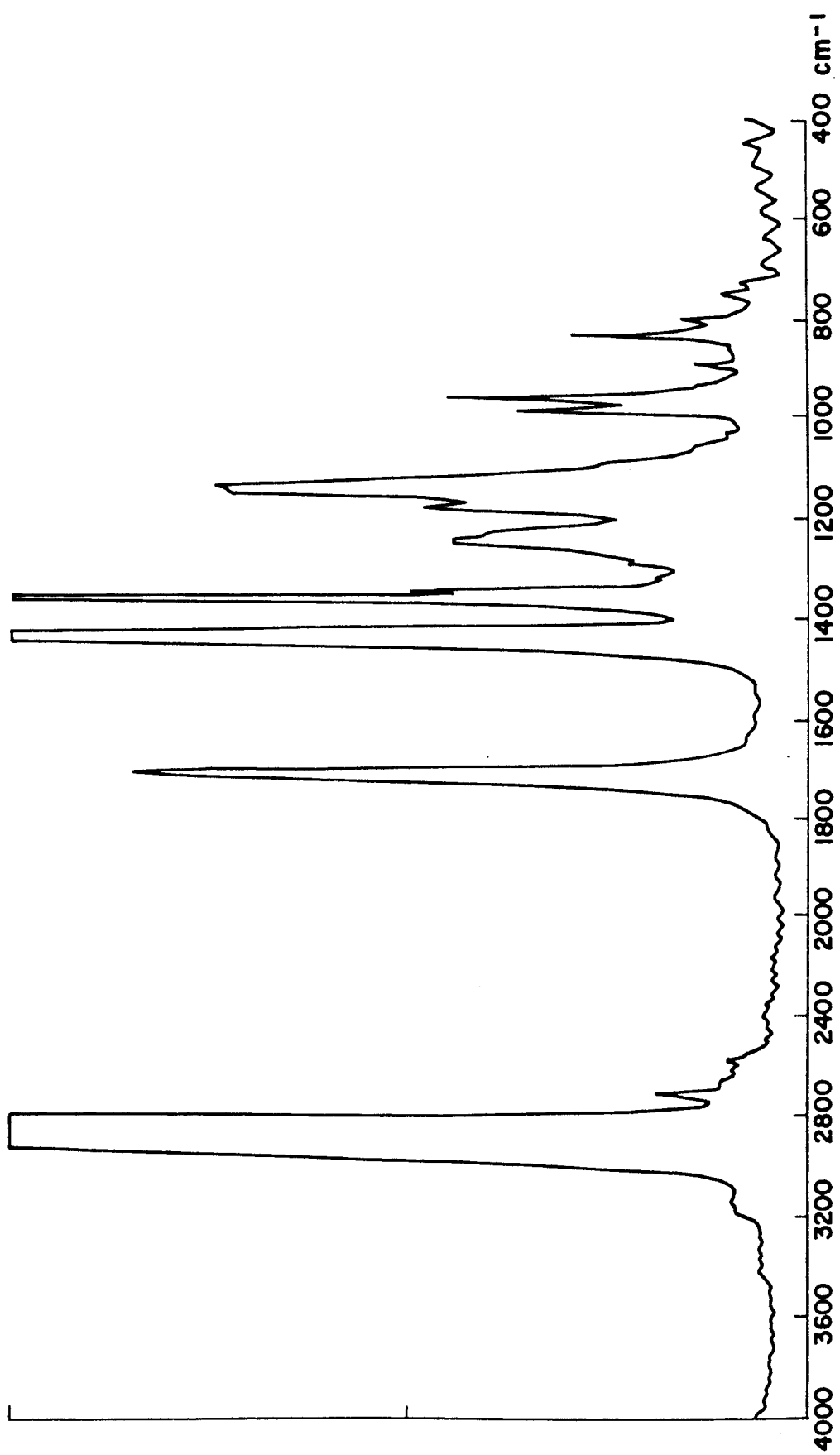
Figure 11:
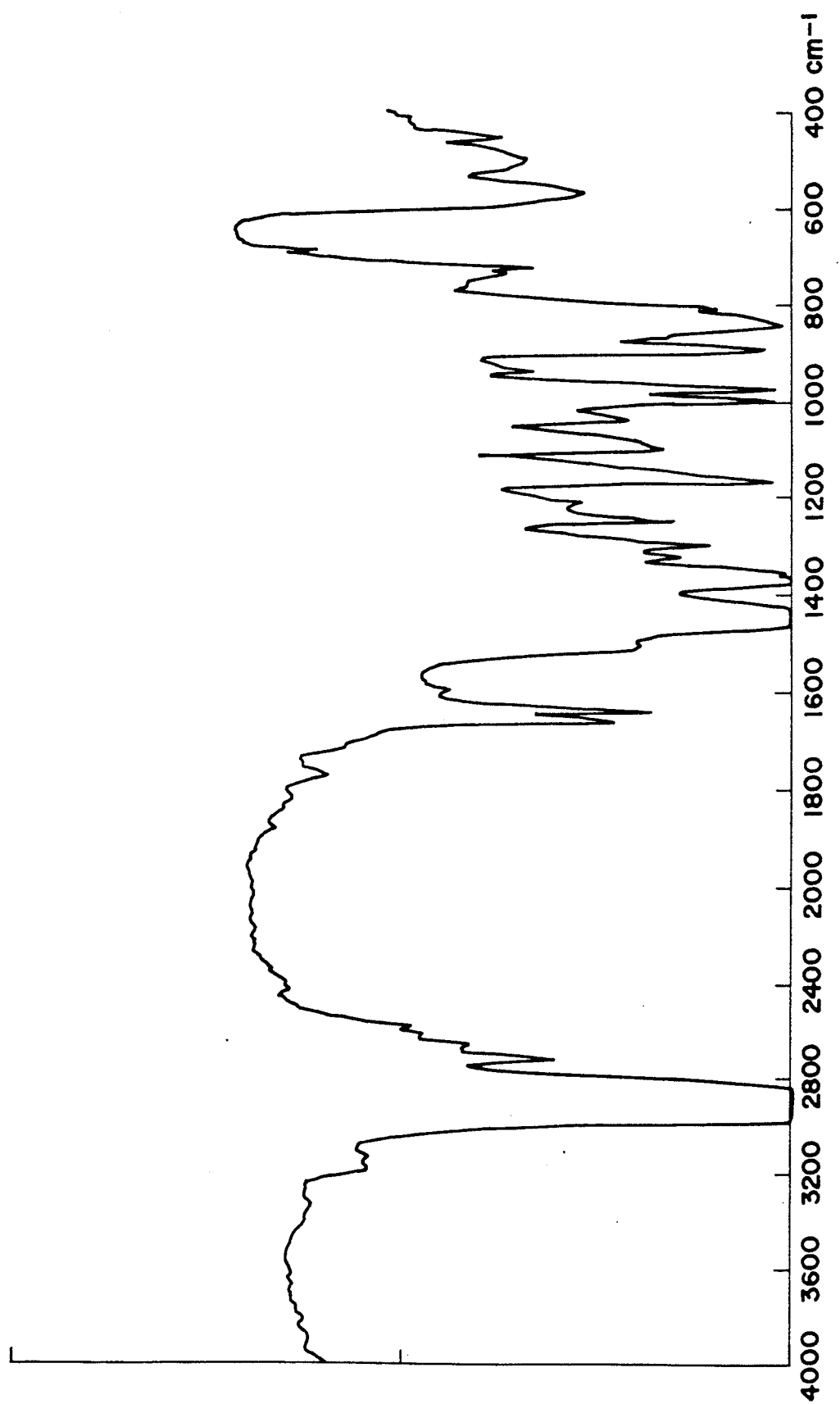
FIGS. 11 through 13 are diagrams showing IR spectra of the copolymers of Example A-24, Reference Example A-6 and Example A-25, respectively.

| | Polymerization in the step (a) | | | | Polymerization in the step (a) | | | Amount of resulting polymer (g) | IR spectrum |
|---|---|---|---|---|---|---|---|---|---|
| Example | Ziegler-Natta catalyst (mmole) | type | α-Olefin (g/hr) | Divinyl-benzene (ml) | Anion-polymer-izable monomer | Anion-polymeri-zation initiator | Temperature/time of anionic polymeriza-tion (°C./hr) | | |
| A20 | TiCl$_4$, 0.987 | n-BuLi 1.93 | Ethylene/ propylene, 13/33 | " | Acrylo-nitrile, 20 ml | n-BuLi, 7.73 mmole | " | 34 | FIG. 7*[b] |
| A21 | TiCl$_4$, 0.987 | n-BuLi 1.93 | Ethylene/ propylene, 13/33 | 4.0 | Vinyltri-ethoxy-silane, 20 ml | n-BuLi, 7.73 mmole | 80/3 | 24.2 | FIG. 8*[a] |
| A22 | TiCl$_4$, 0.987 | n-BuLi 1.93 | solely propylene (7 kg/cm$^2$G) | 2.0 | Isoprene, 20 ml | n-BuLi, 7.73 mmole | 50/3 | 18 | FIG. 9*[a] |
| A23 | TiCl$_4$, 0.987 | n-BuLi 1.93 | solely propylene (7 kg/cm$^2$G) | " | Methyl methacry-late, 20 ml | n-BuLi, 7.73 mmole | 80/3 | 9.3 | FIG. 10*[a] 10*[a] |

*[a]Polymer before MEK extraction.
*[b]Polymer after MEK extraction.

EXAMPLE A24

(1) Copolymerization in the step (a)

Copolymerization was conducted in the same method and condition as in the step (a) of Example A1 except that 380 ml of hydrogen was used to obtain 102.5 g of a propylene/divinylbenzene copolymer (catalyst activity: 1,025 g copolymer/g solid catalyst).

The MFR of the copolymer was 3.22 g/10 min, and the polymerized divinylbenzene content was 0.41% by weight.

(2) Graft copolymerization in the step (b)

To a 1-liter internal volume autoclave which had been displaced with nitrogen gas, 8.0 g of the copolymer product obtained in the precedent step (a), subjected to drying treatment under nitrogen stream at 70° C. for 1 hour and cooled to 20° C., and 200 ml of purified xylene and 16.0 g of purified isoprene were added to the mixture.

After the temperature was raised to and maintained at 110° C. for 0.5 hour, 0.25 mmole portions of n-BuLi were added 4 times (1.0 mmole i total) and the graft polymerization of isoprene was conducted at 110° C. for 3 hours.

After the copolymerization reaction had been completed, the total content of the autoclave was poured into a large excess of methanol to deposit a polymerized product, which was dried under reduced pressure to obtain 24 g of a graft-modified poly-α-olefin.

(3) Analysis of the polymer

Specific absorptions attributed to the carbon-carbon double bonds of polyisoprene are recognized in the vicinity from 1640-1660 cm$^{-1}$ in the IR spectrum of the graft copolymer obtained in the step (b).

Soxhlet extraction for 4.0 g of the copolymer obtained with n-heptane as an extracting solvent gave 2.54 g of an n-heptane extraction insoluble polymer. The polyisoprene content in the n-heptane extraction insoluble polymer was 47.6% by weight in the determination by IR spectrometry. Accordingly, the graft efficiency is 45%.

REFERENTIAL EXAMPLE A6

To a 1-liter internal volume autoclave which had been displaced with nitrogen gas, 8.0 g of a polyisoprene graft-modified poly-α-olefin obtained in the step (b) of Example A24 was added and dried in nitrogen stream at 70° C. for 1 hour. Then, 200 ml of purified decalin, 218 mg of nickel naphthenate and 1 mmole of n-BuLi were added. The autoclave was sufficiently displaced with hydrogen gas and then heated to 110° C., and the hydrogenation reaction of the double bond in the polyisoprene chain was conducted at a hydrogen pressure of 8 kg/cm$^2$G for 3 hours. After the reaction was completed, the autoclave content was poured into a large excess of methanol to deposit a polymerized product, which was then dried under reduced pressure to obtain ca. 8 g of a hydrogenated polymer.

Figure 12:
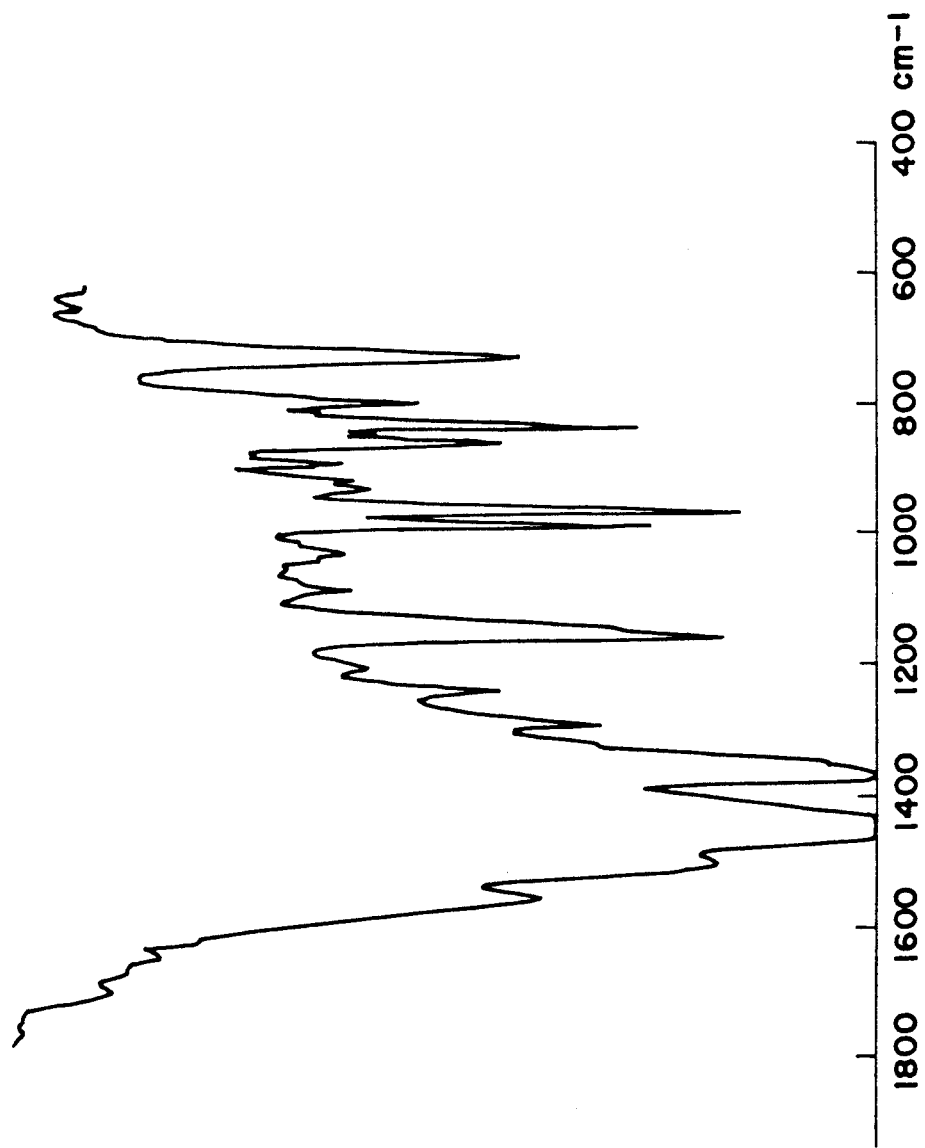

The IR spectrum of the hydrogenated polymer is illustrated in FIG. 12. Absorptions specific to polyisoprene in the vicinity of 1640-1660 cm$^{-1}$ disappeared completely, and characteristic absorptions of ethylene-propylene copolymers in the vicinity of 730 cm$^{-1}$ had newly appeared.

EXAMPLE A25

(1) Copolymerization in the step (a)

Copolymerization was conducted in the same manner and condition as in the step (a) of Example A1 except that 200 mg of titanium trichloride and 600 ml of hydrogen were used to obtain 198 g of a propylene/divinyl-benzene copolymer (catalyst activity: 990 g copolymer/g solid catalyst).

The MFR of the copolymer was 9.26 g/10 min, and the polymerized divinylbenzene content was 0.45% by weight. The GPC of the copolymer gave Mn=2.82×10$^{-4}$ and Mw=27.5×10$^4$.

(2) Graft copolymerization in the step (b)

To a 1-liter internal volume autoclave which had been displaced with nitrogen gas, 8.0 g of the copolymer product obtained in the precedent step (a), subjected to drying treatment under nitrogen stream at 70° C. for 1 hour and cooled to 20° C., and 200 ml of purified decalin and 8.0 g of purified isoprene were added to the mixture. After the temperature was raised to and maintained at 110° C. for 0.5 hour, 0.25 mmole portions of n-BuLi were added 4 times and the reaction was conducted at 110° C. for 1 hour. After the reaction had been completed, the autoclave was displaced sufficiently with nitrogen gas and then 8.0 g of styrene was charged with pressure into the autoclave to conduct reaction at 110° C. for 3 hours. After the copolymerization had been completed, the total content of the autoclave was poured into a large excess of methanol to deposit a polymerized product, which was dried under reduced pressure to obtain 24 g of a graft-modified poly-α-olefin.

(3) Analysis of the polymer

Absorptions specific to polyisoprene are recognized in the vicinity from 1640–1660 cm$^{-1}$ in the IR spectrum of the graft copolymer obtained in the step (b), and absorption specific to polystyrene are recognized in the vicinity of 1600 cm$^{-1}$.

Figure 13:
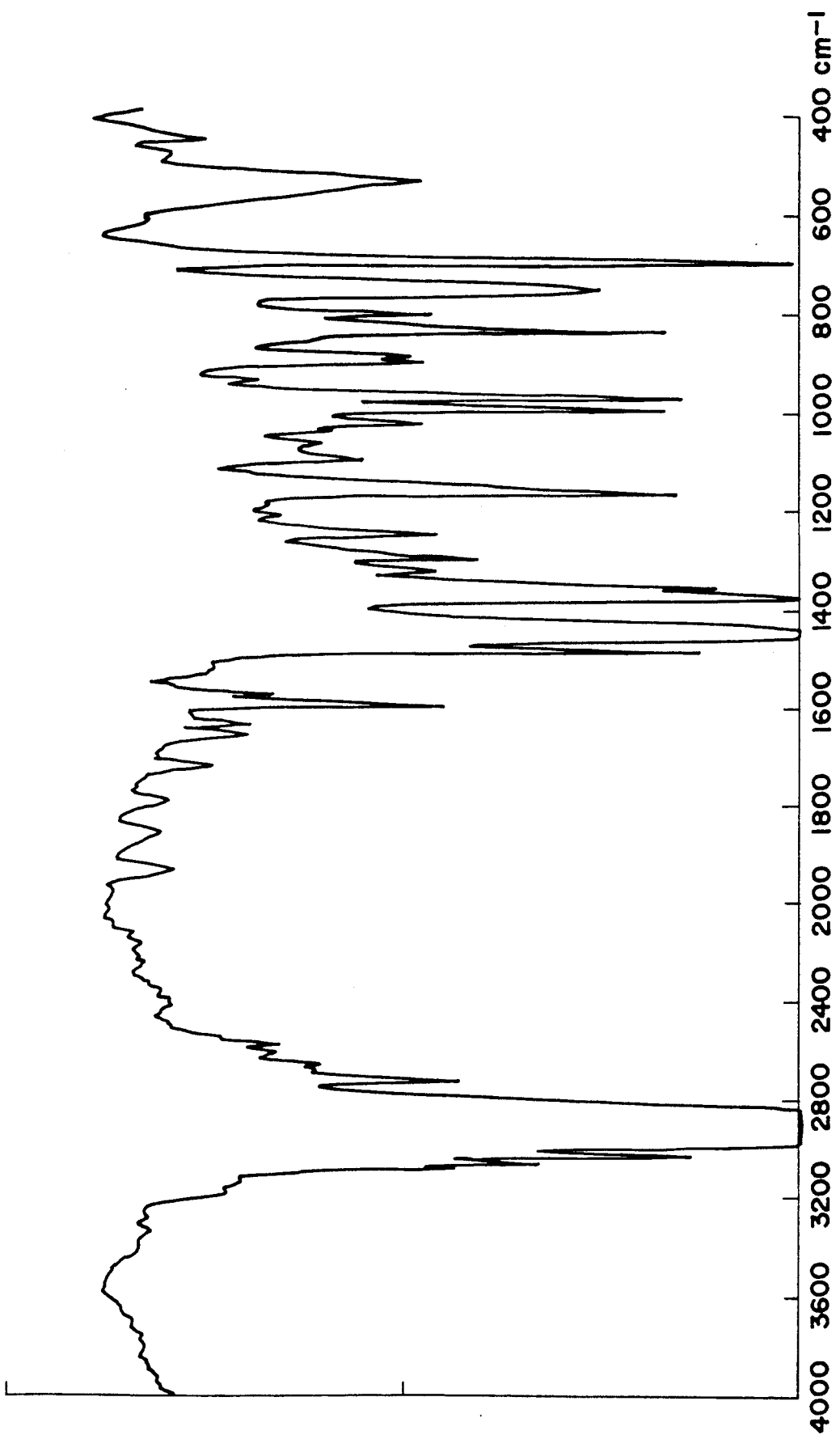
Figure 14:
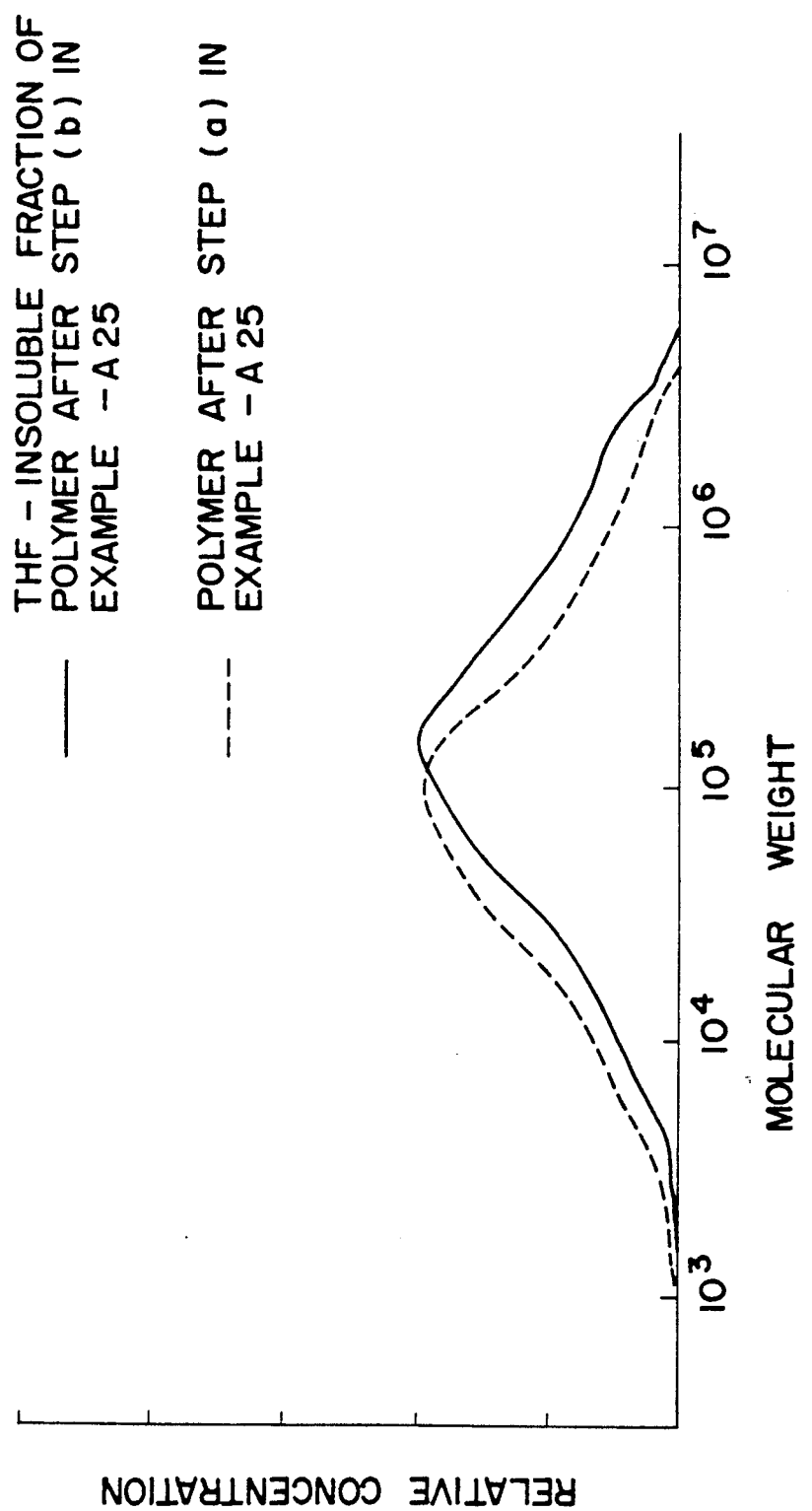
FIG. 14 is a diagram showing the GPC data of the copolymer of Example A-25.

Extraction at room temperature for 4.0 g of the copolymer obtained with THF (tetrahydrofuran) as an extracting solvent gave 1.98 g of a THF extraction insoluble polymer. The contents of polyisoprene and polystyrene in the THF extraction insoluble polymer were 14.8% by weight and 18.1% by weight, respectively, by the determination by IR spectrometry (FIG. 13). Accordingly, the graft efficiencies are 22% for polyisoprene, 27% for polystyrene and 25% in total. Molecular weights of the graft copolymer according to the GPC gave Mn=5.09×10$^4$ and Mw=39.9×10$^4$ (FIG. 14).

The glass transition temperature (Tg) of the polystyrene portion in the graft chain was 100° C. according to the DSC.

EXAMPLE A26

(1) Graft copolymerization in the step (b)

To a 1-liter internal volume autoclave which had been displaced with nitrogen gas, 4.0 g of the copolymer obtained in the precedent step (a) of Example A25, subjected to drying treatment under nitrogen stream at 70° C. for 1 hour and cooled to 20° C., and 200 ml of purified decalin and 8.0 g of purified styrene were added to the mixture. After the mixture was heated to and stirred at 110° C. for 0.5 hour, 0.25 mmole portions of n-BuLi were added 5 times and the graft copolymerization was conducted at 110° C. for 1 hour. Then, 8.0 g of purified isoprene was charged with pressure and polymerized at 110° C. for 3 hours. After the copolymerization had been completed, the total content of the autoclave was poured into a large excess of methanol to deposit a polymerized product, which was dried under reduced pressure to obtain 20 g of a graft-modified poly-α-olefin.

(2) Analysis of the polymer

Figure 15:
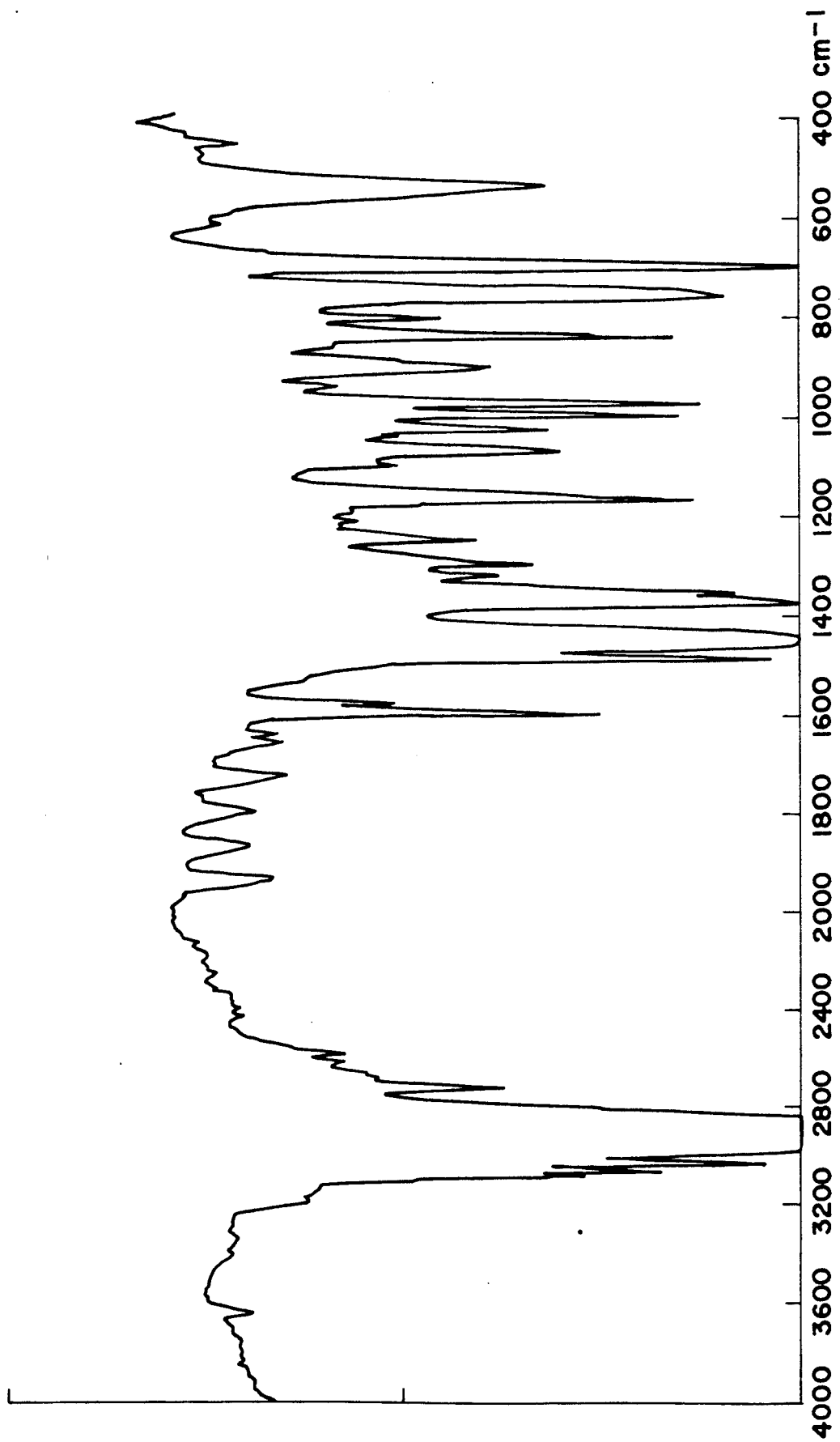
FIGS. 15 through 17 are diagrams showing IR spectra of the copolymers in Example A-26 (FIG. 15) and A-27 (FIGS. 16 and 17), respectively.

Extraction at room temperature for 4.0 g of the copolymer with THF as an extracting solvent gave 1.27 g of a THF extraction insoluble polymer. The contents of polyisoprene and polystyrene in the THF extraction insoluble polymer were 6.3% by weight and 30.8% by weight, respectively, by the determination by IR spectrometry (FIG. 15).

Accordingly, the graft efficiencies are 5.2% for polyisoprene, 24.5% for polystyrene and 15% in total.

EXAMPLE A27

(1) Graft copolymerization in the step (b)

To a 1-liter internal volume autoclave which had been displaced with nitrogen gas, 8.0 g of the copolymer obtained in the precedent step (a) of Example A25, subjected to drying treatment under nitrogen stream at 70° C. for 1 hour and cooled to 20° C., and 200 ml of purified decalin, 16.0 g of purified styrene and 4.0 g of purified isoprene were added to the mixture. After the miture was heated to 110° C. and stirred at that temperature for 0.5 hour, 1 mmole of n-BuLi were charged with pressure and the reaction was conducted at 110° C. for 3 hour. After the copolymerization had been completed, the total content of the autoclave was poured into a large excess of methanol to deposit a polymerized product, which was dried under reduced pressure to obtain 28 g of a graft-modified poly-α-olefin.

(2) Analysis of the polymer

Figure 16:
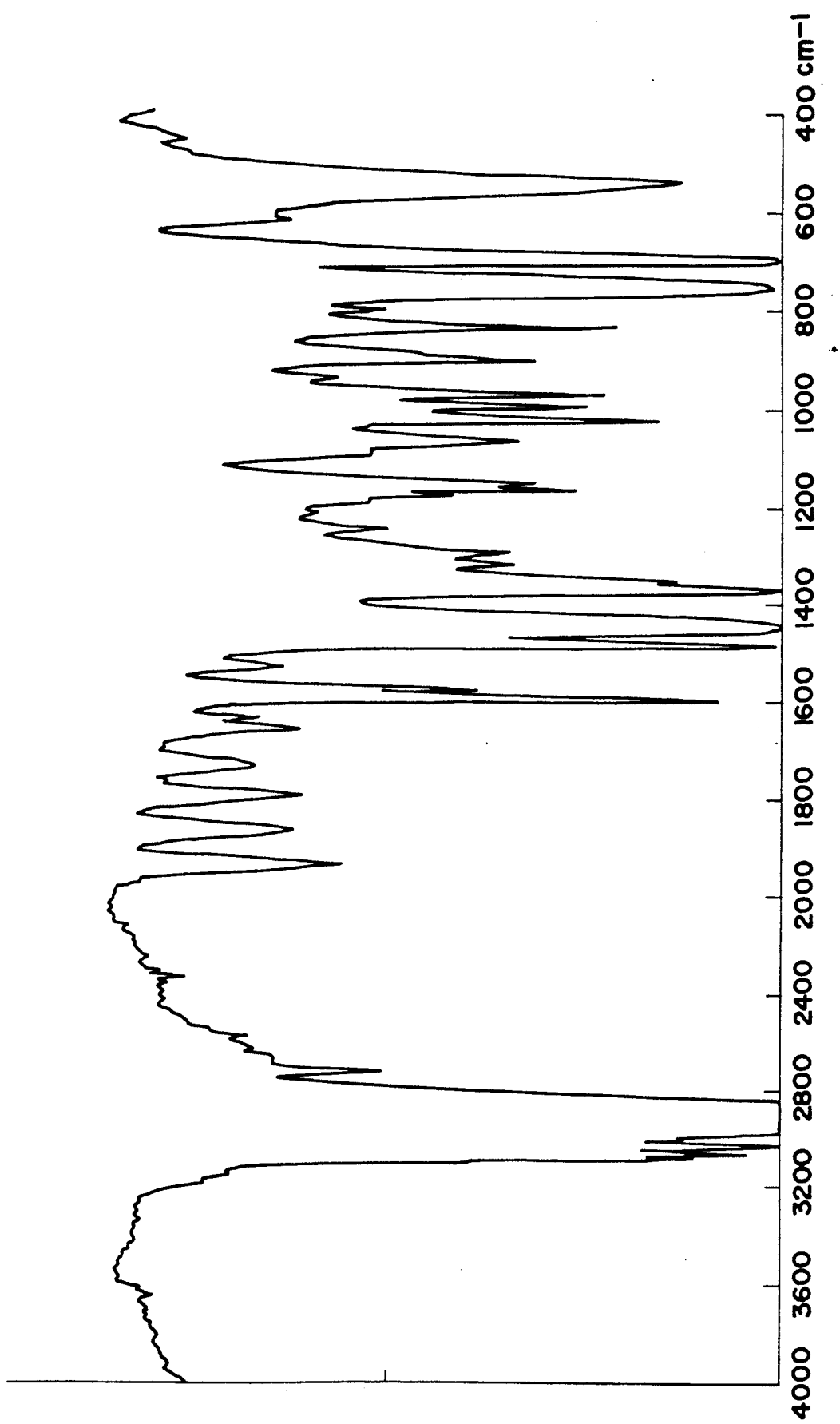
Figure 17:
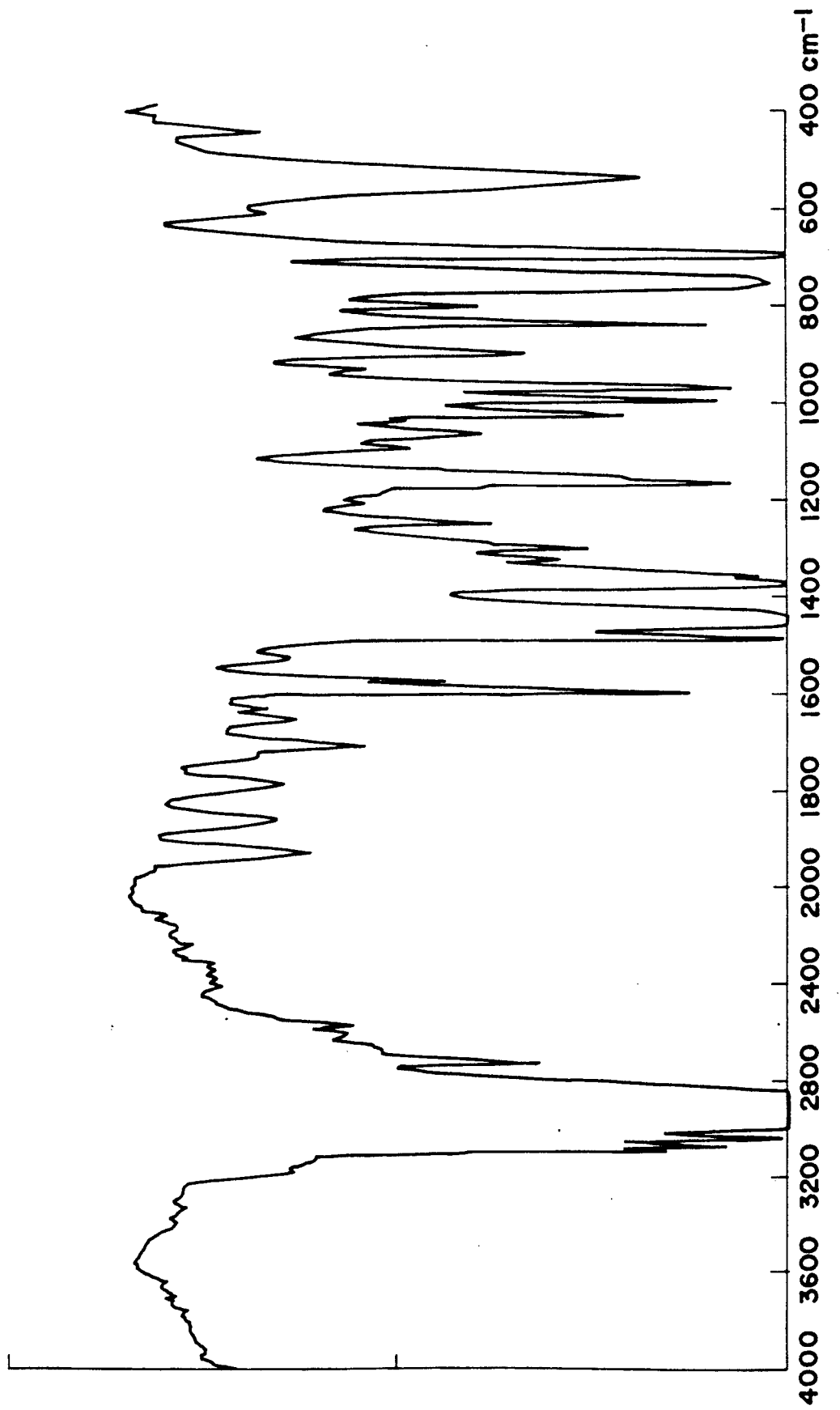

Absorptions specific to polyisoprene and polystyre are recognized in the IR spectrum of the graft copolymer (FIG. 16). Soxhlet extraction for 4.0 g of the graft copolymer for 4 hours with MEK as an extracting solvent gave 1.90 g of a MEK insoluble polymer. The contents of polyisoprene and polystyrene in the MEK insoluble polymer were 5.4% by weight and 34.3% by weight, respectively, by the determination by IR spectrometry (FIG. 17).

Accordingly, the graft efficiencies are 18% for polyisoprene, 29% for polystyrene and 27% in total.

Figure 18:
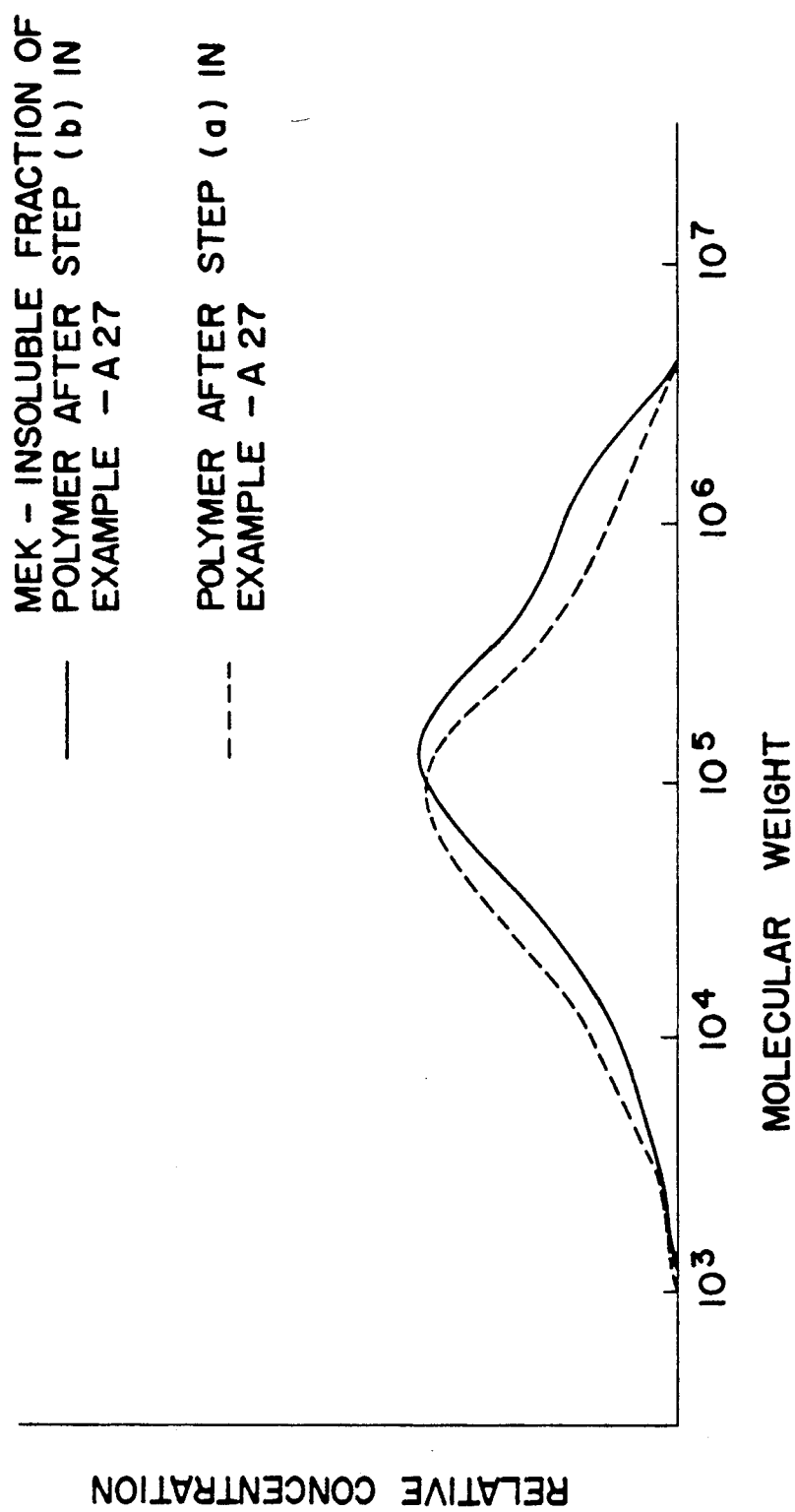
FIG. 18 is a diagram showing the GPC data of the copolymer of Example A-27.

Molecular weights of the graft copolymer according to the GPC gave Mn=3.75×10$^4$ and Mw=33.9×10$^4$ (FIG. 18).

The glass transition temperature (Tg) of the polystyrene portion was 38° C. according to DSC.

When the graft copolymers obtained in Examples A25, A26 and A27 were evaluated by $^1$H-NMR, a separate peak of phenyl protons which are recognized to appear by the presence of a polystyrene segment chain was observed in every case, and thus it is apparent that these polymers comprise at least a polystyrene segment chain.

EXAMPLE A28

(1) Copolymerization in the step (a)

Copolymerization of ethylene/propylene/divinylbenzene was conducted in the same manner and condition as in Example A9 except that 4.49 mmole of triethylaluminium and 2.26 mmole of titanium tetrachloride (molar ratio Al/Ti=2) were used as a catalyst, 5.0 ml of divinylbenzene and 1,000 ml of hydrogen were used and copolymerization time was set as 5 hours.

After the copolymerization had been completed, the gas in the vapor phase of the autoclave was purged and the content of the autoclave was poured into a large excessive amount of methanol to deposit a polymer product, which was dried under reduced pressure to obtain 65.0 g of a ethylene/propylene/divinylbenzene copolymer. The MFR of the copolymer was 2.2 g/10 min, the weight ratio of ethylene/propylene was 80/20, and the content of polymerized divinylbenzene was 0.37% by weight.

(2) Graft copolymerization in the step (b)

A 3.0 g portion of the copolymer obtained in the precedent step (a) was charged in a 300 ml internal volume three-necked flask which had been purged with nitrogen gas and dried under nitrogen stream at 80° C. for 3 hours. Then, 100 ml of purified toluene was added, and the copolymer was subjected to partial dissolution treatment at 60° C. for 1 hour. Next, 6.0 ml of vinyltriethoxysilane and 0.96 mmole of n-butyl lithium were added, and the graft copolymerization of vinyltriethoxysilane was conducted at a temperature of 60° C. for 5 hours.

After the graft copolymerization had been completed, the total content of the flask was poured into a large excessive amount of methanol to deposit a polymer product, which was dried under reduced pressure to obtain 3.50 g of graft-modified poly-α-olefin.

Figure 19:
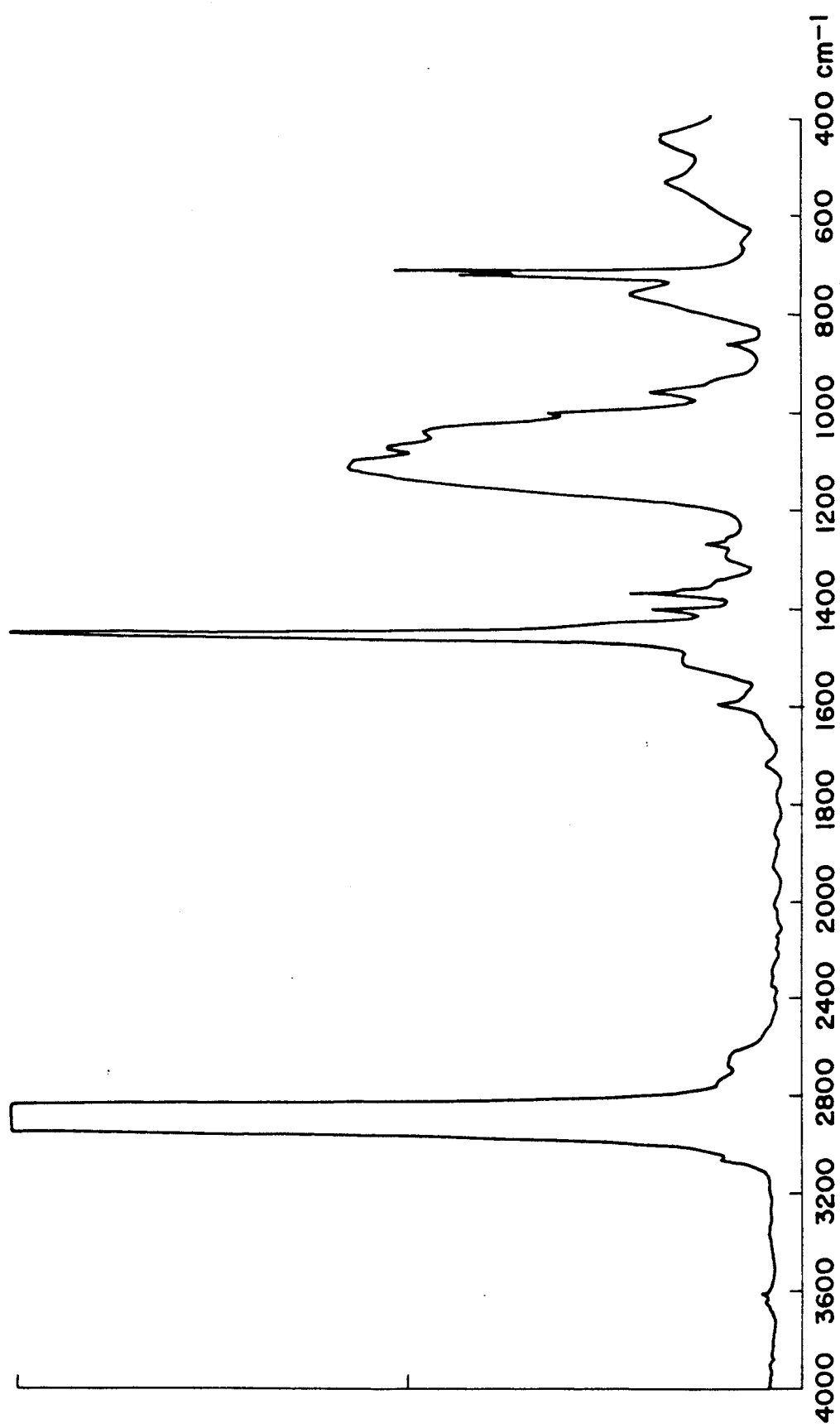
FIGS. 19 and 20 are diagrams showing the IR spectra of the copolymers in Examples A-28 and A-29, respectively.

A 1.5 g portion of the polymer obtained in the precedent step (b) was added to a mixed solvent of 25 ml of toluene and 25 ml of n-heptane and subjected to extraction-rinsing treatment at 50° C. for 5 hours. The IR spectrum of the insoluble portion is illustrated in FIG. 19. Strong absorptions specific to silicon compounds were recognized in the vicinity of 1,000–1,100 $cm^{-1}$, and thus it was confirmed that a vinyltriethoxysilane graft copolymer which would not be extracted off by the solvent was produced.

EXAMPLE A29

(1) Copolymerization in the step (a)

Copolymerization of ethylene/propylene/divinylbenzene was conducted in the same manner and condition as in Example A28 except that 200 ml of hydrogen was used and copolymerization temperature was set at 50° C. to obtain 52.4 g of an ethylene/propylene/divinylbenzene copolymer. The MFR of the copolymer was 1.8 g/10 min, the weight ratio of ethylene/propylene was 76/24, and the content of polymerized divinylbenzene was 0.50% by weight.

(2) Graft copolymerization in the step (b)

A 3.0 g portion of the copolymer obtained in the precedent step (a) was charged in a 300 ml internal volume three-necked flask which had been purged with nitrogen gas and dried under nitrogen stream at 80° C. for 3 hours. Then, 100 ml of purified toluene and 4.0 ml of methyl methacrylate were added. The copolymer was subjected to partial dissolution and methyl methacrylate impregnation treatment at room temperature (25° C.) for 2 hours. Next, 0.48 mmole of n-butyl lithium were added, and the graft copolymerization of methyl methacrylate was conducted at room temperature for 5 hours.

After the graft copolymerization had been terminated by adding a small amount of methanol, the content of the flask was subjected to a concentration treatment under reduced pressure to obtain 3.95 g of a graft-modified poly-α-olefin.

Figure 20:
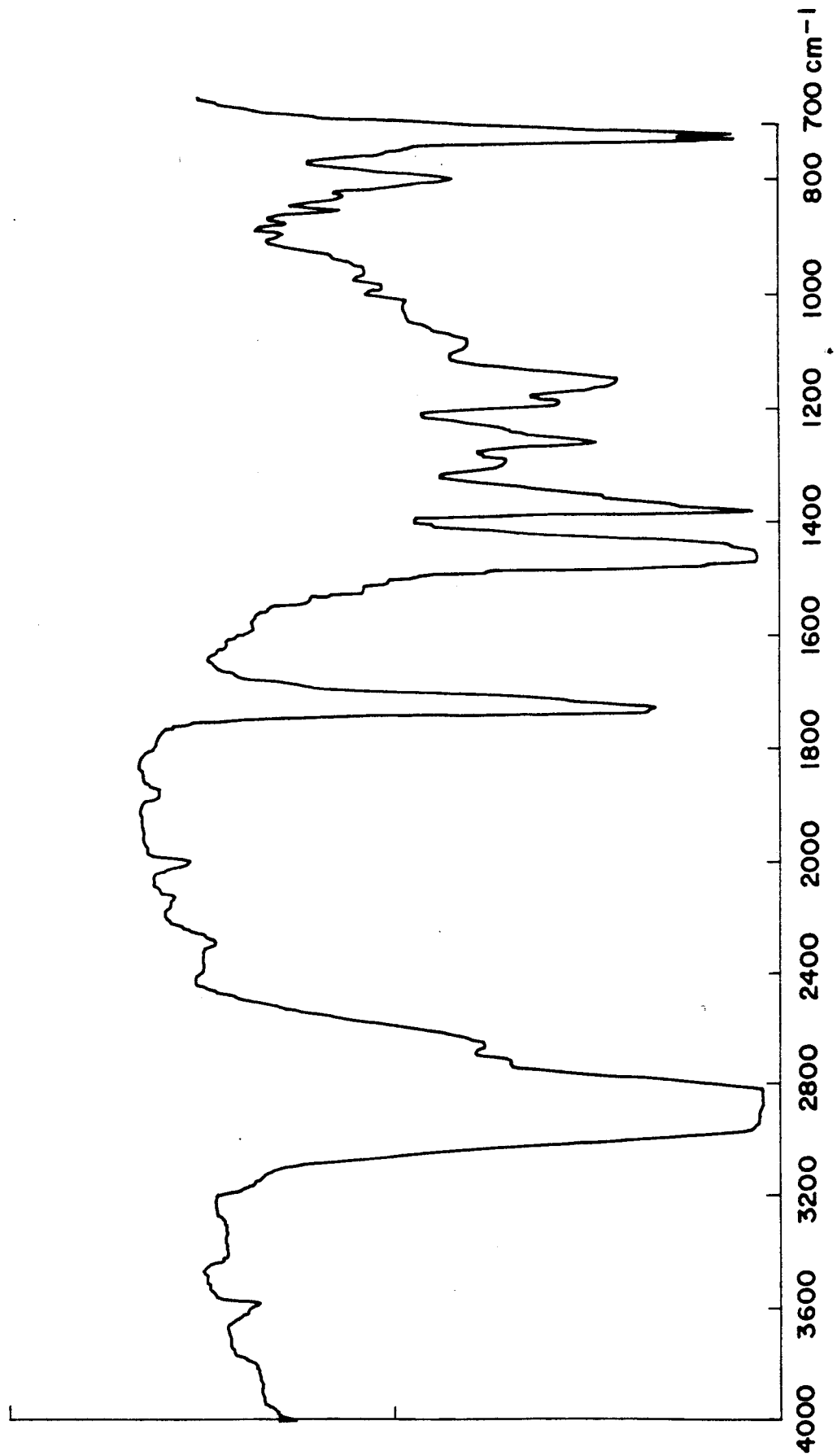

FIG. 20 shows the IR spectrum of the insoluble polymer residual after the Soxhlet extraction with a MEK solvent for 5 hours. Strong absorptions specific to polymethyl methacrylate were recognized in the vicinity of 1,720 $cm^{-1}$, and thus it was confirmed that a methyl methacrylate graft copolymer which would not be extracted off by the MEK solvent was produced.

EXAMPLE B1

(Step 1: Copolymerization of propylene and divinylbenzene)

In a one-liter internal volume stainless steel autoclave equipped with a stirrer and a temperature control unit were introduced after several vacuum-propylene displacements 500 ml of sufficiently dehydrated and deoxygenated n-heptane, 20 ml of divinylbenzene (manufactured by TOKYO KASEI CO., single distillation product of mixture of m- and p-isomers, divinylbenzene content: 53%), 234 mg of diethylaluminium chloride and 100 mg of titanium trichloride (manufactured by TOYO STAUFFER CO., TTA-12)(molar ratio of Al/Ti=3) in this sequence, and 450 ml of hydrogen was charged to initiate copolymerization of propylene and divinylbenzene. Copolymerization was performed under a propylene pressure of 7 kg/$cm^2$G at 65° C. for 3 hours.

After copolymerization was finished, residual monomers were purged off and polymer slurry was filtered to obtain 108.8 g of a powdered copolymer (the catalyst activity was 3,500 g copolymer/g Ti, the MFR was 5.0 g/10 min, and the stereoregularity by the boiling heptane extraction method was 98.1%. The content of copolymerized divinylbenzene in the copolymer was 0.40% by weight according to UV spectrometry.

(Step 2: Graft copolymerization of butylacrylate)

In a 50 ml internal volume three-necked flask, 1 g of the copolymer obtained in the above described step (1) was introduced, and 5.0 ml of butyl acrylate was added under nitrogen gas atmosphere. Thermal graft polymerization of butyl acrylate was conducted at 110° C. for 4 hours.

Figure 21:
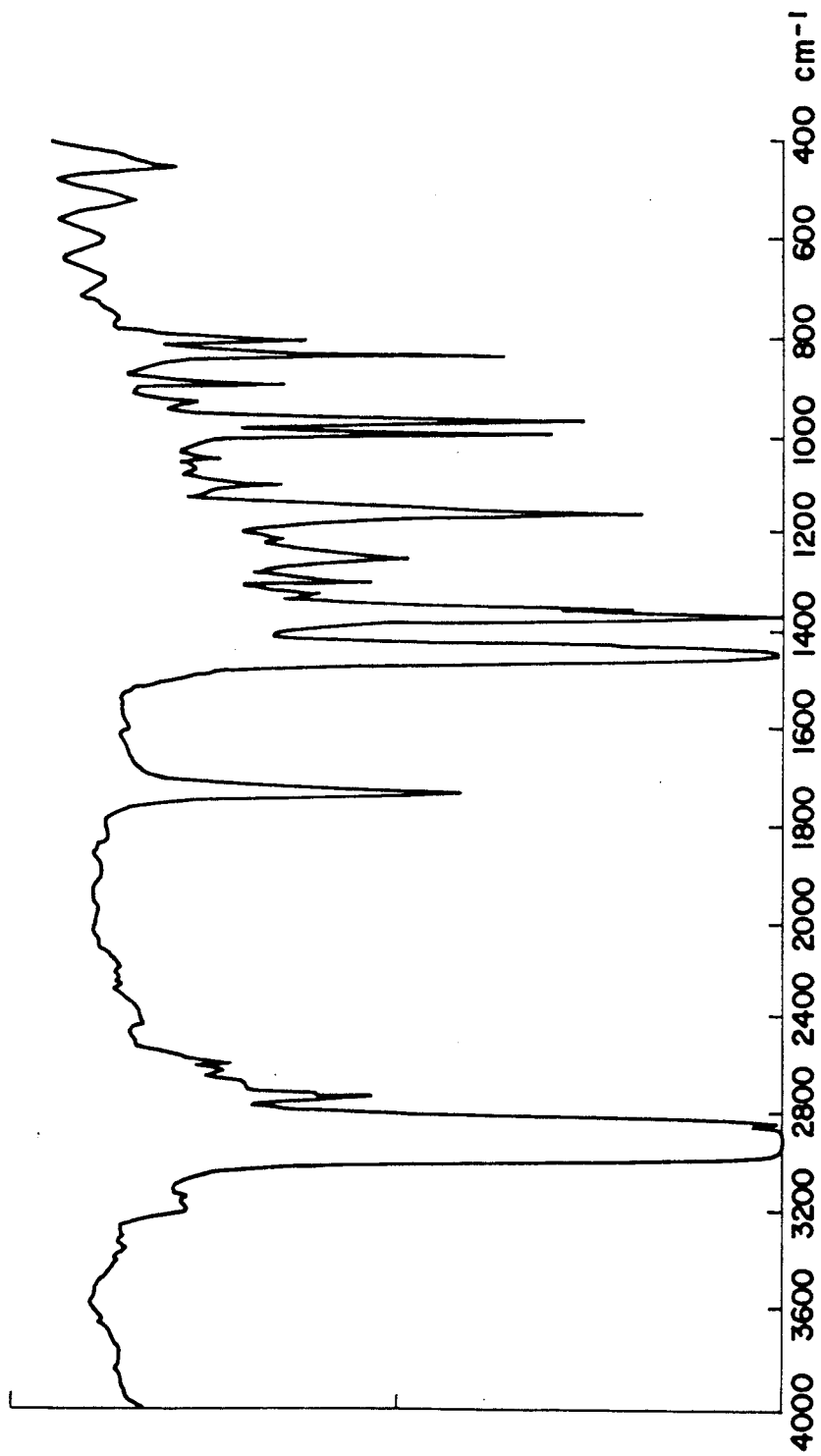
FIGS. 21 and 22 are diagrams showing the IR spectra of the polymers obtained in Example B-1, FIG. 23 that in Comparative Example B-1, FIG. 24 and FIG. 25 those in Example B-2, and FIG. 26 and FIG. 27 those in Example B-3, respectively.

After the polymerization had been completed, the polymerized product was poured into heptane and washed with a large excessive amount of heptane, and dried to obtain a butyl acrylate graft-modified polypropylene, of which IR absorption spectrum is illustrated in FIG. 21. Spectrum specific to the butyl acrylate grafted product was recognized in the vicinity of 1,730 $cm^{-1}$ in FIG. 21.

Figure 22:
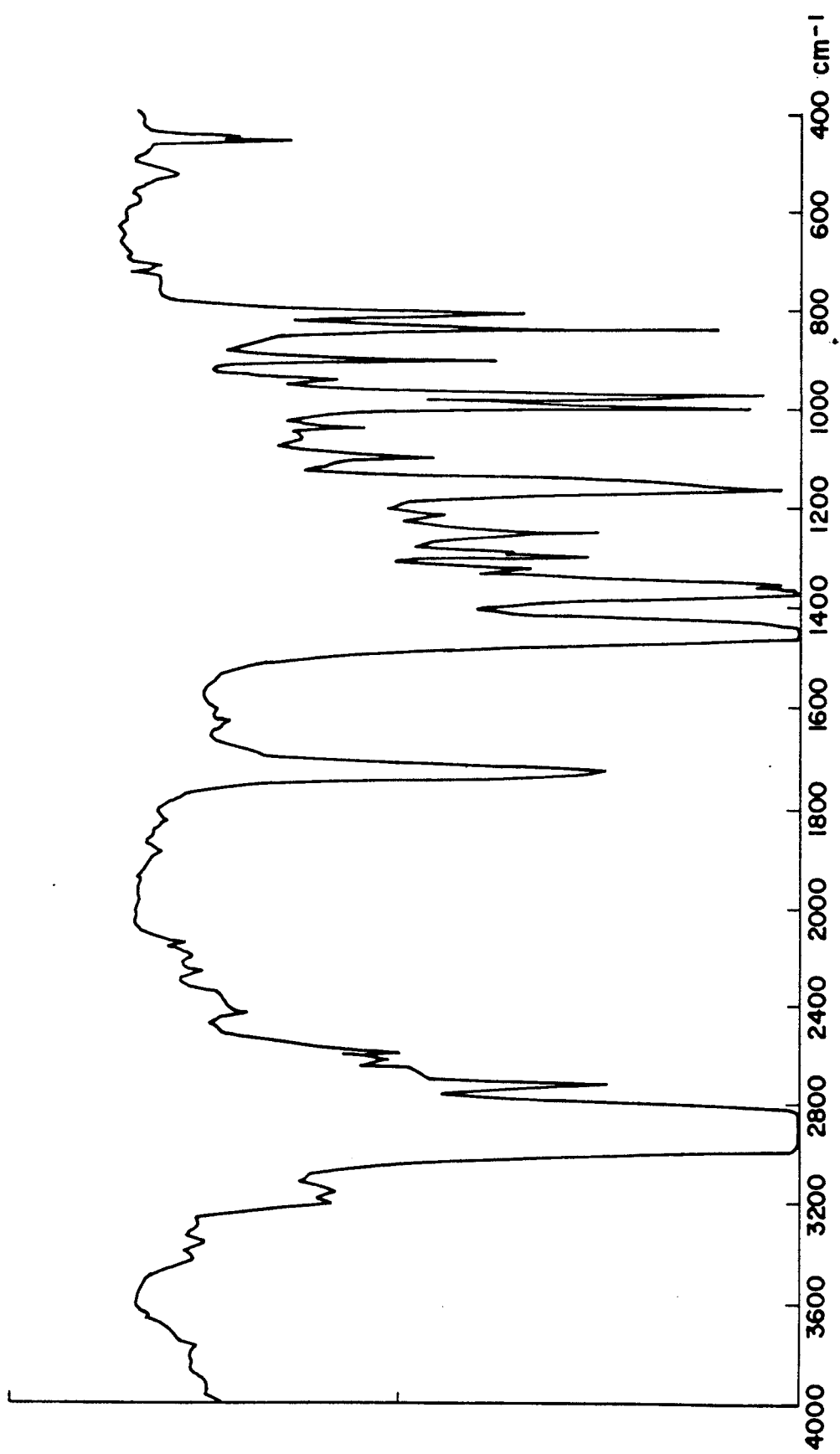

Soxhlet extraction was conducted for about 1 g of the grafted product for 5 hours with methyl ethyl ketone (MEK) as an extraction solvent. The MEK extraction insoluble product was dried and analyzed by IR spectrometry. The IR spectrum of the product is illustrated in FIG. 22. FIG. 22 also exhibits a spectrum similar to that in FIG. 21, and thus it is understood that the polybutyl acrylate is not a homopolymer but grafted with polypropylene.

As one of the measure for specifying the graft efficiency, the following equation for the IR spectra gave a value of 0.73: [$A1730$ $cm^{-1}$/$A1160$ $cm^{-1}$] after solvent extraction/[$A1730$ $cm^{-1}$/$A1160$ $cm^{-1}$] before solvent extraction wherein A is an absorbancy at the specified wave number and 1,160 $cm^{-1}$ shows an absorption spectrum specific to polypropylene.

COMPARATIVE EXAMPLE B1

Homopolymerization of propylene was conducted under the same condition as in Example B1 except that the amount of divinylbenzene used in the polymerization in the step 1 of Example B1 was set to zero, and 205.2 g of a polypropylene was obtained (catalyst activity: 6,600 g PP/g Ti, MFR=8.5 g/10 min).

Figure 23:
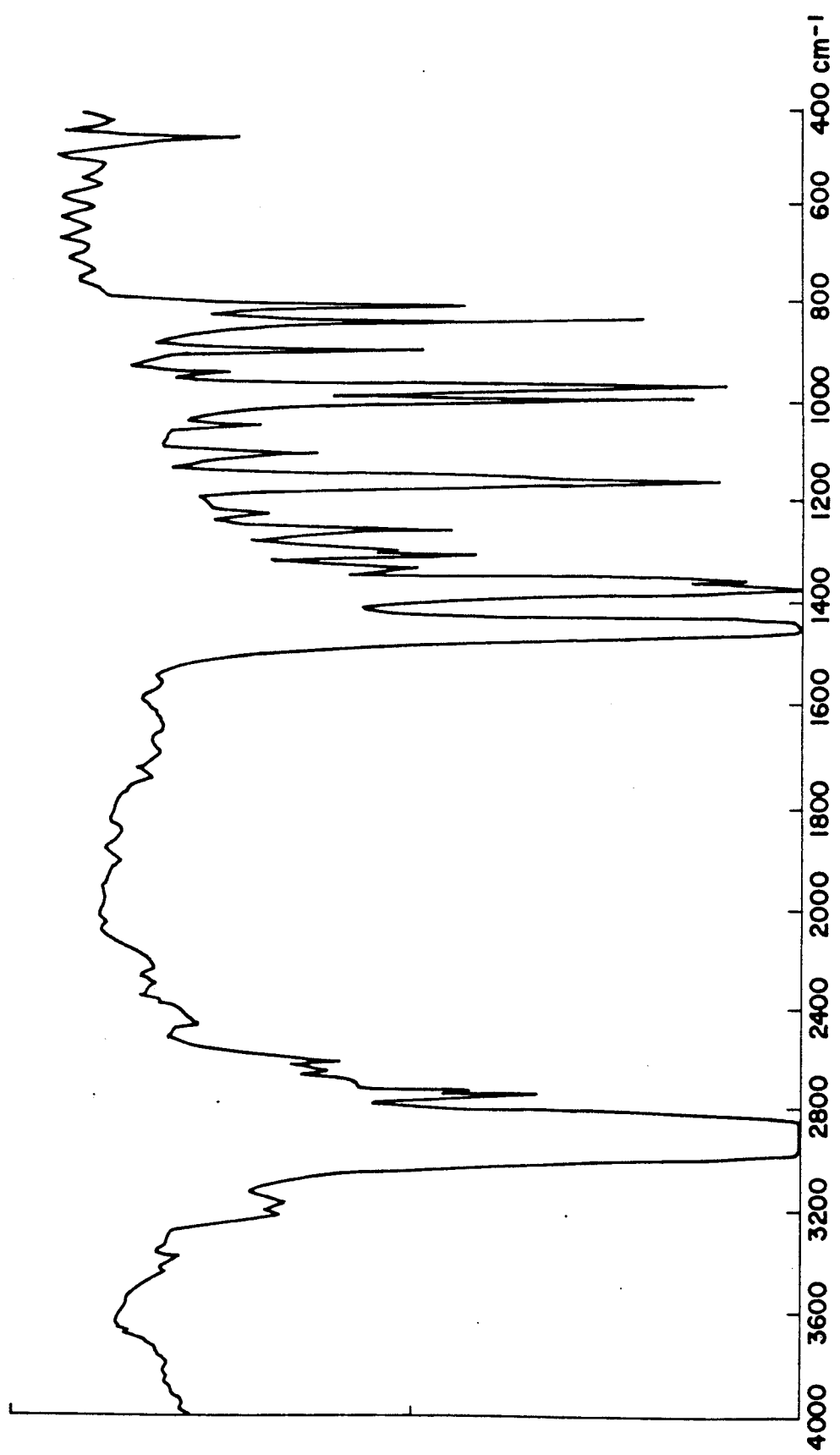

Graft polymerization was tried in the same condition and method as in the step 2 of Example B1 except that 1 g of the polymer was used. However, as illustrated in FIG. 23, polybutyl acrylate could be detected only in a trace amount, and thus the aimed graft-modified polypropylene was not obtained.

EXAMPLE B2

(Step 1: Copolymerization of ethylene/propylene/divinylbenzene)

In a one-liter internal volume stainless steel autoclave equipped with a stirrer and a temperature control unit were introduced after several vacuum-propylene displacements 500 ml of sufficiently dehydrated and deoxygenated n-heptane, 1 ml of divinylbenzene (as used in Example B1), 3.86 mmole of n-butyl lithium and 1.97 mmole of titanium tetrachloride (molar ratio of Li/Ti=1.96) in this sequence to form a Ziegler-Natta type catalyst.

After 1500 ml of hydrogen was further charged in the autoclave, a mixed gas of ethylene and propylene was continuously fed at a feed rate or ratio of 13 g/hr and 33 g/hr, respectively, to initiate copolymerization (of ethylene, propylene and divinylbenzene). Copolymerization was performed at a temperature of 25° C. for 3 hours (constant rate feeding polymerization method of an α-olefin).

After the copolymerization was completed, the total amount of the autoclave was subjected to steam stripping to obtain 49.0 g of an olefin copolymer.

The weight ratio of ethylene/propylene of the copolymer was 59/41 according to IR spectrometry. The polymerized divinylbenzene content was 0.17% by weight according to UV spectrometry.

(Step 2: Graft copolymerization of butylacrylate)

In a 50 ml internal volume flask, 1 g of the olefin copolymer obtained in the above described step (1) was introduced, and 3 ml of toluene and 5 ml of methyl methacrylate were added under nitrogen gas atmosphere. Thermal graft polymerization of methyl methacrylate was conducted at 80° C. for 4 hours.

Figure 24:
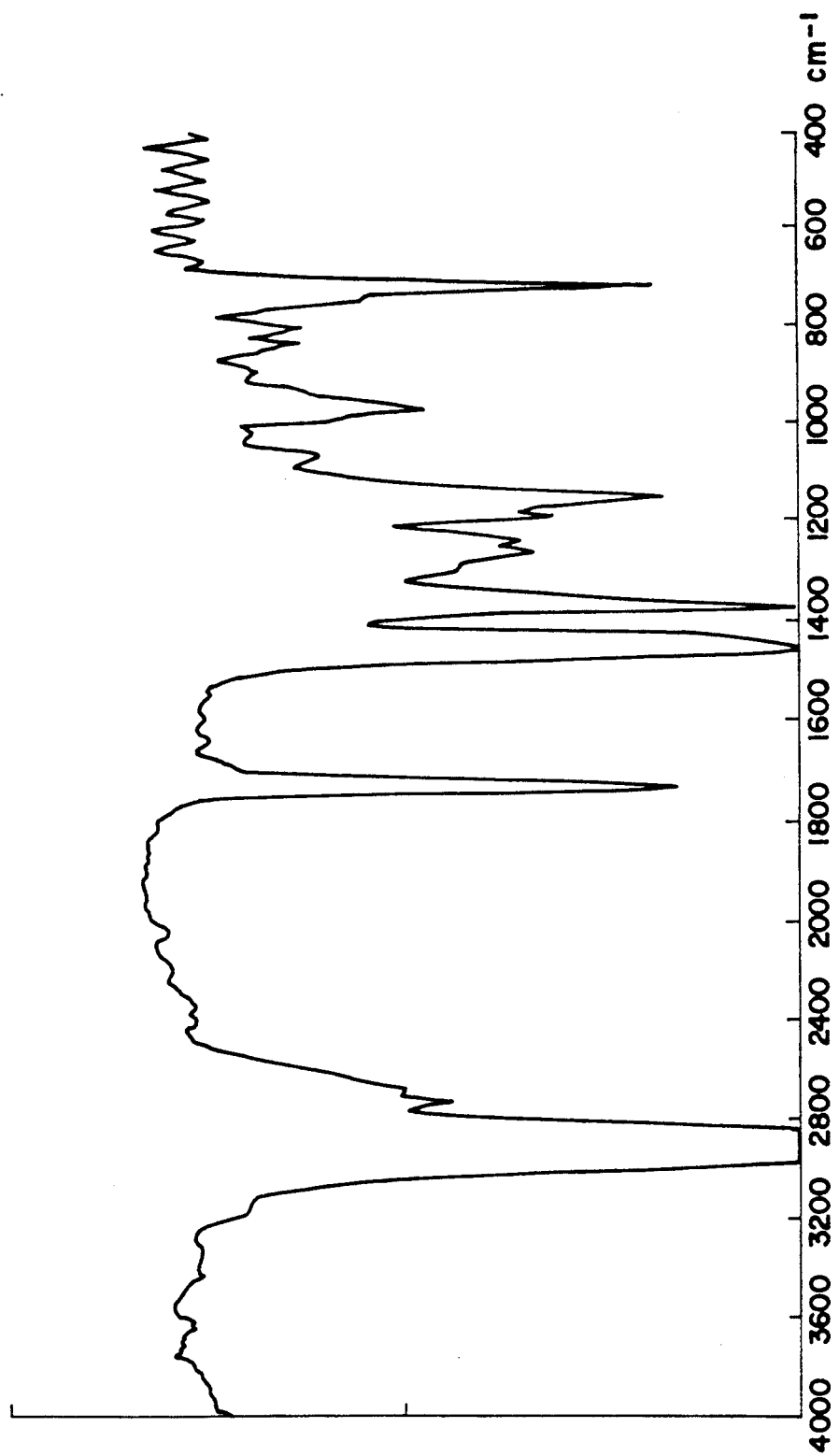

After the polymerization had been completed, the polymerized product was washed with acetone to obtain a methyl methacrylate graft-modified olefin copolymer, of which IR absorption spectrum is illustrated in FIG. 24. Spectrum specific to the methyl methacrylate grafted product was recognized in the vicinity of 1,720–1,730 cm$^{-1}$ in FIG. 24.

Soxhlet extraction was conducted for 1 g of the grafted product for 5 hours with MEK as an extraction solvent. The MEK extraction insoluble product was dried and analyzed by IR spectrometry. The IR spectrum of the product is illustrated in FIG. 25. Absorption spectrum specific to polymethyl methacrylate was recognized also in FIG. 25, and thus it is understood that the polymethyl methacrylate is grafted to the olefin copolymer obtained in the step 1.

As one of the scales for specifying the graft efficiency, the following equation for the IR spectra gave a value of 0.44: [$^{J}$1720 cm$^{-1}$/$^{J}$720 cm$^{-1}$] after solvent extraction/[$^{J}$1720 cm$^{-1}$/$^{J}$720 cm$^{-1}$] before solvent extraction wherein 720 cm$^{-1}$ shows an absorption spectrum specific to polyethylene.

EXAMPLE B3

(Step 1: Copolymerization of ethylene/propylene/divinylbenzene)

Copolymerization of ethylene/propylene/divinylbenzene was conducted in the same condition and method as in Example B2 except that the amount of divinylbenzene used was set as 3.0 ml to obtain 43.1 g of a copolymer (ethylene/propylene/divinylbenzene).

The weight ratio of ethylene/propylene of the copolymer was 66/34, and the polymerized divinylbenzene content was 0.26% by weight.

(Step 2: Graft copolymerization of butylacrylate)

Thermal graft polymerization was conducted with the use of 1 g of the copolymer obtained in the precedent step 1 in the same manner as in the step 2 of Example B2.

Figure 26:
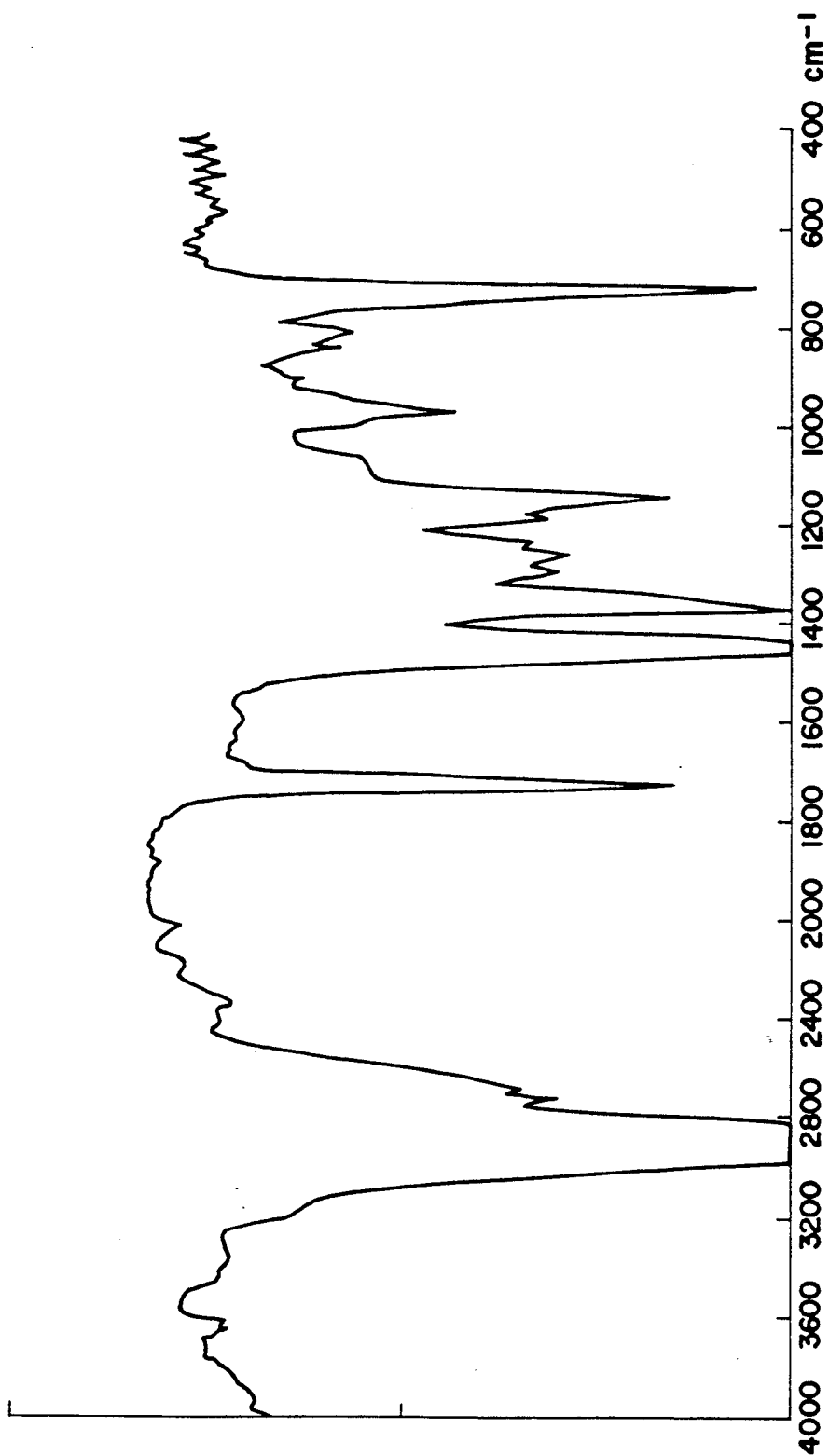
Figure 27:
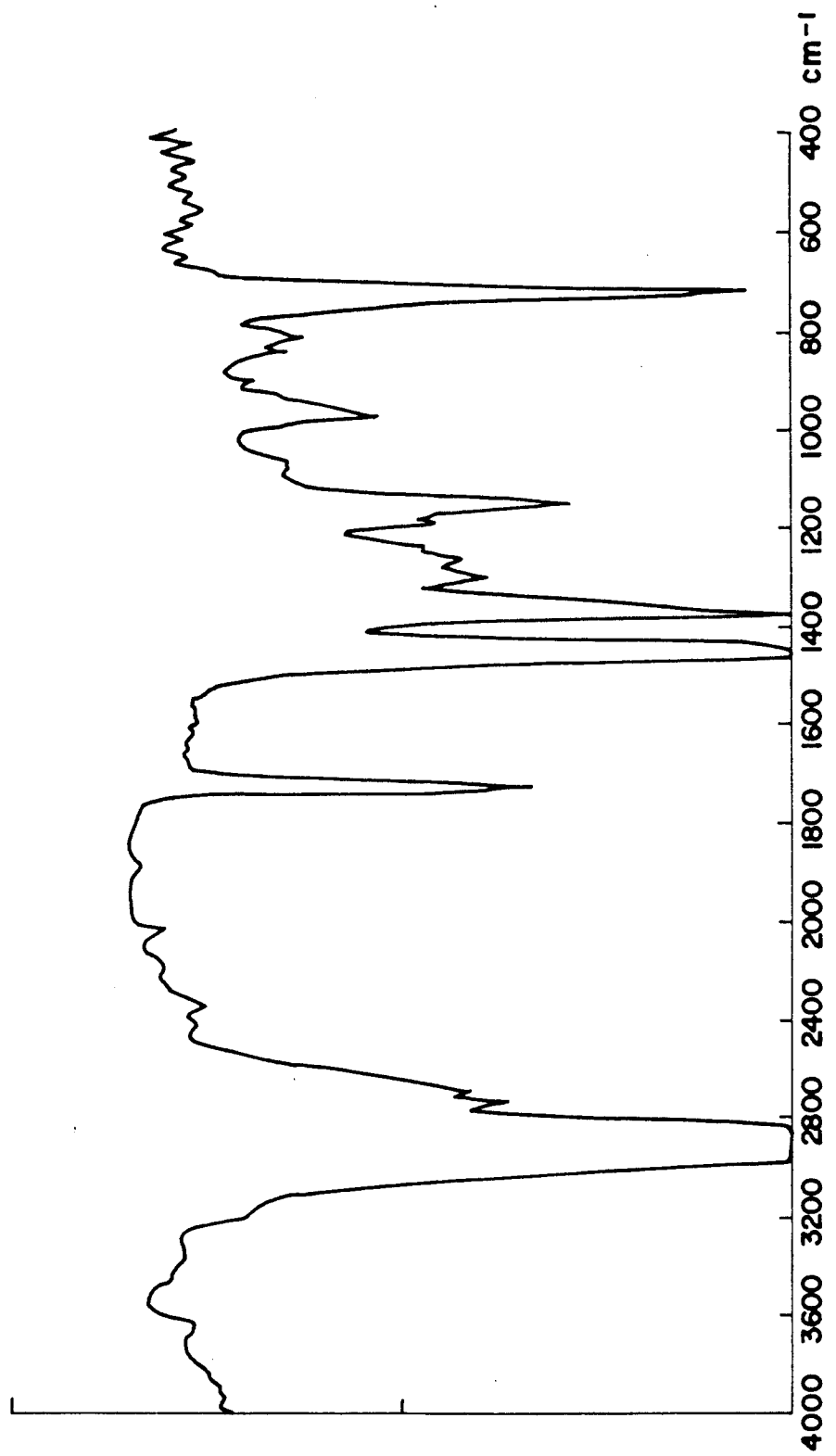

IR aborption spectra before and after Soxhlet extraction with MEK are illustrated in FIGS. 26 and 27, respectively. The graft efficiency defined in Example B2 was 0.60.

EXAMPLE B4

(Step 2: Graft polymerization of styrene to polypropylene)

To a 1-liter internal volume flask were added 200 ml of distilled water, 6 g of tribasic calcium phosphate and 0.012 g of sodium dodecylbenzenesulfonate. The mixture was stirred for 5 minutes, and 50 g of a styrene monomer, 0.25 g of benzoyl peroxide and 0.70 g of t-butyl peroxypivalate as well as 50 g of a propylene/divinylbenzene copolymer obtained in the step 1 of Example B1 were added to the mixture. The mixture was stirred at 200–250 rpm to perform the graft polymerization of styrene at 50° C. for 3 hours, at 75° C. for 2 hours and further at 90° C. for 3 hours.

After cooling, the content was taken out and washed with a large excessive amount of water to obtain 99.9 g of an aimed styrene graft-modified polypropylene (styrene conversion: 99.8%). Soxhlet extraction of 10 g of the graft-modified polypropylene was conducted with MEK for 5 hours. The polystyrene content in the extraction insoluble product was 20.5% by weight according to IR spectrometry.

Accordingly, the graft efficiency as defined by the equation [polymer of radical polymerizable monomers which are not extracted with an extraction solvent (weight)/total polymer of radical polymerizable monomers (weight)]×100 was 26%.

EXAMPLES B5–B8

Graft polymerization of styrene was conducted in the same method and condition as in Example B4 except that 50 g of the propylene/divinylbenzene copolymer obtained by the same method and condition in the step 1 of Example P1 and the polymerization initiators and the polymerization conditions were changed as specified in Table B1 to produce graft-modified poly-α-olefin copolymers.

TABLE B1

| Example | Graft polymerization initiator | Graft polymerization condition temperature (°C.)/time (hr) | Conversion of styrene (%) | Content of gel polymer (%)* | Polystyrene content in MEK extraction insoluble portion (% by weight) | Graft efficiency (%) |
|---|---|---|---|---|---|---|
| B5 | t-Butyl peroxybenzoate | 90/4 - 105/4 - 135/4.5 | 98.5 | 0.63 | 25.6 | 35 |
| B6 | t-Butyl peroxy-2- | 60/4 - 75/4 - 105/4.5 | 98.8 | 12.1 | 30.5 | 44 |

TABLE B1-continued

| Example | Graft polymerization initiator | Graft polymerization condition temperature (°C.)/time (hr) | Conversion of styrene (%) | Content of gel polymer (%)* | Polystyrene content in MEK extraction insoluble portion (% by weight) | Graft efficiency (%) |
|---|---|---|---|---|---|---|
| B7 | ethylhexanoate Azobisisobutyronitrile | 50/4 - 65/4 - 90/4.5 | 99.3 | 15.6 | 28.5 | 41 |
| B8 | (No catalyst, themal graft polymerization) | 90/4 - 105/4 - 135/4.5 | 71.0 | 0.01 | 13.3 | 35 |

*Content of the graft polymer remaining after the polymer was kneaded with a Brabender (230°C.), ground, then placed in a 60-mesh cylindrical metal net and subjected to Soxhlet extraction for 8 hours.

COMPARATIVE EXAMPLE

Graft polymerization of styrene was conducted in the same method and condition as in Example B4 except that 50 g of a homopolymer of propylene obtained in Comparative Example B1 was used in place of the copolymer of propylene and divinylbenzene. As the result, 100 g of a graft copolymer was obtained (with a styrene conversion of 100%).

Soxhlet extraction of the graft copolymer with MEK was conducted in the same manner as in Example B4. The polystyrene content in the extraction insoluble product was 6.2% by weight. Accordingly, the graft efficiency as defined in Example B4 was as low as 6.7%.

By comparing Example B4 and Comparative B2, it is understood that although a polypropylene homopolymer is also graft-modified with the use of a radical initiator such as an organic peroxide the graft ratio and the graft efficiency are extremely low as compared with the use of the propylene/divinylbenzene copolymer of the present invention.

What is claimed is:

1. A process for producing a graft-modified α-olefin copolymer, which comprises the following step (a) and step (b):

Step (a): the step of copolymerizing with the use of a Ziegler-Natta catalyst on an α-olefin having 2 to 20 carbon atoms with a dialkenylbenzene represented by the formula:

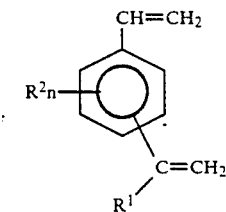

Wherein, $R^1$ represents a methyl group or a hydrogen atom, $R^2$ represents a hydrocarbyl group having 1 to 6 carbon atoms and n represents 0 or 1; and Step (b): the step of graft-polymerizing by a radical polymerization a radical polymerizable monomer onto said olefin copolymer obtained in the step (a); thereby to produce a graft-modified α-olefin copolymer having a gel content of 5% or less, the gel content being determined by a method wherein the graft-modified olefin copolymer is subjected, after bromine is added to it to saturate the unreacted alkenyl groups not used for the graft reaction, to the Soxhlet's extraction by use of xylene, and the residual amount after extraction is defined as the gel content.

2. The process according to claim 1, wherein the α-olefin is a straight or branched aliphatic α-olefin having 2 to 8 carbon atoms.

3. The process according to claim 1, wherein the dialkenylbenzene is selected from the group consisting of divinylbenzene, isopropenylstyrene, divinyltoluene and divinylnaphthalene.

4. The process according to claim 1, wherein the Ziegler-Natta catalyst comprises a compound of a metal of the groups IV to VI of the Periodic Table and an organometallic compound of a metal of the groups I to III of the Periodic Table.

5. The process according to claim 4, wherein the compound of a metal of the groups IV to VI of the Periodic Table is a compound of titanium.

6. The process according to claim 1, wherein the organometallic compound is selected from organometallic compounds of lithium and organometallic compounds of aluminum.

7. The process according to claim 1, wherein a copolymer with a dialkenylbenzene content of 0.001 to 10% by weight is obtained by the step (a).

8. The process according to claim 1, wherein the monomer used in the step (b) is selected from the group consisting of $C_1$–$C_{10}$ alkyl esters of acrylic acid or methacrylic acid, styrenes which may or may not have a lower alkyl substituent on the nucleus or in the side chain, and vinylsilanes.

* * * * *